(12) United States Patent
Spiro et al.

(10) Patent No.: US 10,484,407 B2
(45) Date of Patent: Nov. 19, 2019

(54) SYSTEMS, METHODS, USER INTERFACES, AND COMPUTER-READABLE MEDIA FOR INVESTIGATING POTENTIAL MALICIOUS COMMUNICATIONS

(71) Applicant: Palantir Technologies Inc., Palo Alto, CA (US)

(72) Inventors: Ezra Spiro, New York City, NY (US); Joseph Staehle, New York City, NY (US); Andrew Levine, New York City, NY (US); Juan Ricafort, New York City, NY (US); Alvaro Morales, New York City, NY (US)

(73) Assignee: Palantir Technologies Inc., Palo Alto, CA (US)

( * ) Notice: Subject to any disclaimer, the term of this patent is extended or adjusted under 35 U.S.C. 154(b) by 171 days.

(21) Appl. No.: 15/459,872

(22) Filed: Mar. 15, 2017

(65) Prior Publication Data

US 2017/0187739 A1   Jun. 29, 2017

Related U.S. Application Data

(63) Continuation of application No. 15/253,717, filed on Aug. 31, 2016, now Pat. No. 9,635,046, which is a
(Continued)

(51) Int. Cl.
*H04L 29/06*  (2006.01)
*G06F 16/2457*  (2019.01)
(Continued)

(52) U.S. Cl.
CPC ........ *H04L 63/1425* (2013.01); *G06F 3/0482* (2013.01); *G06F 16/24578* (2019.01);
(Continued)

(58) Field of Classification Search
CPC ............ H04L 63/1425; H04L 63/1416; H04L 63/1433; H04L 63/1483; H04L 51/12;
(Continued)

(56) References Cited

U.S. PATENT DOCUMENTS 5,109,399 A   4/1992  Thompson
5,329,108 A   7/1994  Lamoure
(Continued)

FOREIGN PATENT DOCUMENTS

CN   101729531   6/2010
CN   103281301   9/2013
(Continued)

OTHER PUBLICATIONS

US 8,712,906 B1, 04/2014, Sprague et al. (withdrawn)
(Continued)

*Primary Examiner* — Catherine Thiaw
(74) *Attorney, Agent, or Firm* — Knobbe, Martens, Olson & Bear, LLP

(57) ABSTRACT

A data analysis system receives potentially undesirable electronic communications and automatically groups them in computationally-efficient data clusters, automatically analyze those data clusters, automatically tags and groups those data clusters, and provides results of the automated analysis and grouping in an optimized way to an analyst. The automated analysis of the data clusters may include an automated application of various criteria or rules so as to generate an ordered display of the groups of related data clusters such that the analyst may quickly and efficiently evaluate the groups of data clusters. In particular, the groups of data clusters may be dynamically re-grouped and/or filtered in an interactive user interface so as to enable an
(Continued)

analyst to quickly navigate among information associated with various groups of data clusters and efficiently evaluate those data clusters.

11 Claims, 15 Drawing Sheets

Related U.S. Application Data continuation of application No. 15/072,174, filed on Mar. 16, 2016, now Pat. No. 9,456,000.

(60) Provisional application No. 62/202,104, filed on Aug. 6, 2015.

(51) Int. Cl.
| | |
|---|---|
| *G06F 3/0482* | (2013.01) |
| *G06F 21/55* | (2013.01) |
| *H04L 12/58* | (2006.01) |
| *G06F 16/951* | (2019.01) |

(52) U.S. Cl.
CPC .......... *G06F 16/951* (2019.01); *G06F 21/552* (2013.01); *H04L 51/12* (2013.01); *H04L 63/1416* (2013.01); *H04L 63/1433* (2013.01); *H04L 63/1483* (2013.01)

(58) Field of Classification Search
CPC ............... G06F 3/0482; G06F 17/3053; G06F 17/30864; G06F 21/552; G06F 16/951; G06F 16/24578
See application file for complete search history.

(56) References Cited

U.S. PATENT DOCUMENTS

| | | | |
|---|---|---|---|
| 5,632,009 | A | 5/1997 | Rao et al. |
| 5,670,987 | A | 9/1997 | Doi et al. |
| 5,781,704 | A | 7/1998 | Rossmo |
| 5,798,769 | A | 8/1998 | Chiu et al. |
| 5,845,300 | A | 12/1998 | Comer |
| 5,978,475 | A | 11/1999 | Schneier et al. |
| 6,057,757 | A | 5/2000 | Arrowsmith et al. |
| 6,091,956 | A | 7/2000 | Hollenberg |
| 6,161,098 | A | 12/2000 | Wallman |
| 6,219,053 | B1 | 4/2001 | Tachibana et al. |
| 6,232,971 | B1 | 5/2001 | Haynes |
| 6,247,019 | B1 | 6/2001 | Davies |
| 6,253,203 | B1 | 6/2001 | O'Flaherty et al. |
| 6,279,018 | B1 | 8/2001 | Kudrolli et al. |
| 6,341,310 | B1 | 1/2002 | Leshem et al. |
| 6,366,933 | B1 | 4/2002 | Ball et al. |
| 6,369,835 | B1 | 4/2002 | Lin |
| 6,374,251 | B1 | 4/2002 | Fayyad et al. |
| 6,456,997 | B1 | 9/2002 | Shukla |
| 6,549,944 | B1 | 4/2003 | Weinberg et al. |
| 6,560,620 | B1 | 5/2003 | Ching |
| 6,567,936 | B1 | 5/2003 | Yang et al. |
| 6,581,068 | B1 | 6/2003 | Bensoussan et al. |
| 6,594,672 | B1 | 7/2003 | Lampson et al. |
| 6,631,496 | B1 | 10/2003 | Li et al. |
| 6,642,945 | B1 | 11/2003 | Sharpe |
| 6,674,434 | B1 | 1/2004 | Chojnacki et al. |
| 6,714,936 | B1 | 3/2004 | Nevin, III |
| 6,725,240 | B1 | 4/2004 | Asad et al. |
| 6,775,675 | B1 | 8/2004 | Nwabueze et al. |
| 6,778,982 | B1 * | 8/2004 | Knight .................. G06Q 10/10 707/737 |
| 6,807,569 | B1 | 10/2004 | Bhimani et al. |
| 6,820,135 | B1 | 11/2004 | Dingman |
| 6,828,920 | B2 | 12/2004 | Owen et al. |
| 6,839,745 | B1 | 1/2005 | Dingari et al. |
| 6,877,137 | B1 | 4/2005 | Rivette et al. |
| 6,968,511 | B1 * | 11/2005 | Robertson ............... G06F 3/048 715/205 |
| 6,976,210 | B1 | 12/2005 | Silva et al. |
| 6,978,419 | B1 | 12/2005 | Kantrowitz |
| 6,980,984 | B1 | 12/2005 | Huffman et al. |
| 6,985,950 | B1 | 1/2006 | Hanson et al. |
| 7,017,046 | B2 | 3/2006 | Doyle et al. |
| 7,036,085 | B2 | 4/2006 | Barros |
| 7,043,702 | B2 | 5/2006 | Chi et al. |
| 7,055,110 | B2 | 5/2006 | Kupka et al. |
| 7,069,586 | B1 | 6/2006 | Winneg et al. |
| 7,139,800 | B2 | 11/2006 | Bellotti et al. |
| 7,158,878 | B2 | 1/2007 | Rasmussen et al. |
| 7,162,475 | B2 | 1/2007 | Ackerman |
| 7,168,039 | B2 | 1/2007 | Bertram |
| 7,171,427 | B2 | 1/2007 | Witowski et al. |
| 7,225,468 | B2 | 5/2007 | Waisman et al. |
| 7,269,786 | B1 | 9/2007 | Malloy et al. |
| 7,278,105 | B1 | 10/2007 | Kitts |
| 7,290,698 | B2 | 11/2007 | Poslinski et al. |
| 7,333,998 | B2 | 2/2008 | Heckerman et al. |
| 7,370,047 | B2 | 5/2008 | Gorman |
| 7,373,669 | B2 | 5/2008 | Eisen |
| 7,379,811 | B2 | 5/2008 | Rasmussen et al. |
| 7,379,903 | B2 | 5/2008 | Caballero et al. |
| 7,426,654 | B2 | 9/2008 | Adams et al. |
| 7,451,397 | B2 | 11/2008 | Weber et al. |
| 7,454,466 | B2 | 11/2008 | Bellotti et al. |
| 7,467,375 | B2 | 12/2008 | Tondreau et al. |
| 7,487,139 | B2 | 2/2009 | Fraleigh et al. |
| 7,502,786 | B2 | 3/2009 | Liu et al. |
| 7,525,422 | B2 | 4/2009 | Bishop et al. |
| 7,529,727 | B2 | 5/2009 | Arning et al. |
| 7,529,734 | B2 | 5/2009 | Dirisala |
| 7,546,245 | B2 | 6/2009 | Surpin et al. |
| 7,558,677 | B2 | 7/2009 | Jones |
| 7,574,409 | B2 | 8/2009 | Patinkin |
| 7,574,428 | B2 | 8/2009 | Leiserowitz et al. |
| 7,579,965 | B2 | 8/2009 | Bucholz |
| 7,593,995 | B1 | 9/2009 | He et al. |
| 7,596,285 | B2 | 9/2009 | Brown et al. |
| 7,614,006 | B2 | 11/2009 | Molander |
| 7,617,232 | B2 | 11/2009 | Gabbert et al. |
| 7,620,628 | B2 | 11/2009 | Kapur et al. |
| 7,627,812 | B2 | 12/2009 | Chamberlain et al. |
| 7,634,717 | B2 | 12/2009 | Chamberlain et al. |
| 7,640,173 | B2 | 12/2009 | Surpin et al. |
| 7,703,021 | B1 | 4/2010 | Flam |
| 7,706,817 | B2 | 4/2010 | Bamrah et al. |
| 7,712,049 | B2 | 5/2010 | Williams et al. |
| 7,716,067 | B2 | 5/2010 | Surpin et al. |
| 7,716,077 | B1 | 5/2010 | Mikurak |
| 7,725,530 | B2 | 5/2010 | Sah et al. |
| 7,725,547 | B2 | 5/2010 | Albertson et al. |
| 7,730,082 | B2 | 6/2010 | Sah et al. |
| 7,730,109 | B2 | 6/2010 | Rohrs et al. |
| 7,752,665 | B1 | 7/2010 | Robertson et al. |
| 7,770,032 | B2 | 8/2010 | Nesta et al. |
| 7,770,100 | B2 | 8/2010 | Chamberlain et al. |
| 7,783,658 | B1 | 8/2010 | Bayliss |
| 7,801,871 | B2 | 9/2010 | Gosnell |
| 7,805,457 | B1 | 9/2010 | Viola et al. |
| 7,809,703 | B2 | 10/2010 | Balabhadrapatruni et al. |
| 7,814,102 | B2 | 10/2010 | Miller et al. |
| 7,818,658 | B2 | 10/2010 | Chen |
| 7,870,493 | B2 | 1/2011 | Pall et al. |
| 7,894,984 | B2 | 2/2011 | Rasmussen et al. |
| 7,899,611 | B2 | 3/2011 | Downs et al. |
| 7,917,376 | B2 | 3/2011 | Bellin et al. |
| 7,920,963 | B2 | 4/2011 | Jouline et al. |
| 7,933,862 | B2 | 4/2011 | Chamberlain et al. |
| 7,941,321 | B2 | 5/2011 | Greenstein et al. |
| 7,962,281 | B2 | 6/2011 | Rasmussen et al. |
| 7,962,495 | B2 | 6/2011 | Jain et al. |
| 7,962,848 | B2 | 6/2011 | Bertram |
| 7,970,240 | B1 | 6/2011 | Chao et al. |
| 7,971,150 | B2 | 6/2011 | Raskutti et al. |
| 7,984,374 | B2 | 6/2011 | Caro et al. |
| 8,001,465 | B2 | 8/2011 | Kudrolli et al. |

(56) References Cited

U.S. PATENT DOCUMENTS

| | | |
|---|---|---|
| 8,001,482 B2 | 8/2011 | Bhattiprolu et al. |
| 8,010,545 B2 | 8/2011 | Stefik et al. |
| 8,010,886 B2 | 8/2011 | Gusmorino et al. |
| 8,015,487 B2 | 9/2011 | Roy et al. |
| 8,019,709 B2 | 9/2011 | Norton et al. |
| 8,024,778 B2 | 9/2011 | Cash et al. |
| 8,036,632 B1 | 10/2011 | Cona et al. |
| 8,036,971 B2 | 10/2011 | Aymeloglu et al. |
| 8,046,283 B2 | 10/2011 | Burns |
| 8,046,362 B2 | 10/2011 | Bayliss |
| 8,054,756 B2 | 11/2011 | Chand et al. |
| 8,082,172 B2 | 12/2011 | Chao et al. |
| 8,103,543 B1 | 1/2012 | Zwicky |
| 8,134,457 B2 | 3/2012 | Velipasalar et al. |
| 8,135,679 B2 | 3/2012 | Bayliss |
| 8,135,719 B2 | 3/2012 | Bayliss |
| 8,145,703 B2 | 3/2012 | Frishert et al. |
| 8,181,253 B1 | 5/2012 | Zaitsev et al. |
| 8,185,819 B2 | 5/2012 | Sah et al. |
| 8,190,893 B2 | 5/2012 | Benson et al. |
| 8,196,184 B2 | 6/2012 | Amirov et al. |
| 8,214,361 B1 | 7/2012 | Sandler et al. |
| 8,214,490 B1 | 7/2012 | Vos et al. |
| 8,214,764 B2 | 7/2012 | Gemmell et al. |
| 8,225,201 B2 | 7/2012 | Michael |
| 8,229,902 B2 | 7/2012 | Vishniac et al. |
| 8,229,947 B2 | 7/2012 | Fujinaga |
| 8,230,333 B2 | 7/2012 | Decherd et al. |
| 8,239,668 B1 | 8/2012 | Chen et al. |
| 8,266,168 B2 | 9/2012 | Bayliss |
| 8,271,461 B2 | 9/2012 | Pike et al. |
| 8,271,598 B2 | 9/2012 | Guy et al. |
| 8,280,880 B1 | 10/2012 | Aymeloglu et al. |
| 8,290,926 B2 | 10/2012 | Ozzie et al. |
| 8,290,942 B2 | 10/2012 | Jones et al. |
| 8,301,464 B1 | 10/2012 | Cave et al. |
| 8,301,904 B1 | 10/2012 | Gryaznov |
| 8,302,855 B2 | 11/2012 | Ma et al. |
| 8,312,367 B2 | 11/2012 | Foster |
| 8,312,546 B2 | 11/2012 | Alme |
| 8,321,943 B1 | 11/2012 | Walters et al. |
| 8,347,398 B1 | 1/2013 | Weber |
| 8,352,881 B2 | 1/2013 | Champion et al. |
| 8,368,695 B2 | 2/2013 | Howell et al. |
| 8,397,171 B2 | 3/2013 | Klassen et al. |
| 8,411,046 B2 | 4/2013 | Kruzeniski et al. |
| 8,412,707 B1 | 4/2013 | Mianji |
| 8,447,674 B2 | 5/2013 | Choudhuri et al. |
| 8,447,722 B1 | 5/2013 | Ahuja et al. |
| 8,452,790 B1 | 5/2013 | Mianji |
| 8,463,036 B1 | 6/2013 | Ramesh et al. |
| 8,473,454 B2 | 6/2013 | Evanitsky et al. |
| 8,484,115 B2 | 7/2013 | Aymeloglu et al. |
| 8,484,168 B2 | 7/2013 | Bayliss |
| 8,489,331 B2 | 7/2013 | Kopf et al. |
| 8,489,641 B1 | 7/2013 | Seefeld et al. |
| 8,495,077 B2 | 7/2013 | Bayliss |
| 8,498,969 B2 | 7/2013 | Bayliss |
| 8,498,984 B1 | 7/2013 | Hwang et al. |
| 8,510,743 B2 | 8/2013 | Hackborn et al. |
| 8,514,082 B2 | 8/2013 | Cova et al. |
| 8,515,207 B2 | 8/2013 | Chau |
| 8,554,579 B2 | 10/2013 | Tribble et al. |
| 8,554,653 B2 | 10/2013 | Falkenborg et al. |
| 8,554,709 B2 | 10/2013 | Goodson et al. |
| 8,560,413 B1 | 10/2013 | Quarterman |
| 8,577,911 B1 | 11/2013 | Stepinski et al. |
| 8,589,273 B2 | 11/2013 | Creeden et al. |
| 8,595,234 B2 | 11/2013 | Siripuapu et al. |
| 8,600,872 B1 | 12/2013 | Yan |
| 8,620,641 B2 | 12/2013 | Farnsworth et al. |
| 8,639,757 B1 | 1/2014 | Zang et al. |
| 8,646,080 B2 | 2/2014 | Williamson et al. |
| 8,676,597 B2 | 3/2014 | Buehler et al. |
| 8,676,857 B1 | 3/2014 | Adams et al. |
| 8,682,812 B1 | 3/2014 | Ranjan |
| 8,683,322 B1 | 3/2014 | Cooper |
| 8,689,108 B1 | 4/2014 | Duffield et al. |
| 8,700,547 B2 | 4/2014 | Long et al. |
| 8,707,185 B2 | 4/2014 | Robinson et al. |
| 8,713,018 B2 | 4/2014 | Knight et al. |
| 8,713,467 B1 | 4/2014 | Goldenberg et al. |
| 8,726,379 B1 | 5/2014 | Stiansen et al. |
| 8,739,278 B2 | 5/2014 | Varghese |
| 8,742,934 B1 | 6/2014 | Sarpy et al. |
| 8,744,890 B1 | 6/2014 | Bernier |
| 8,745,516 B2 | 6/2014 | Mason et al. |
| 8,756,244 B2 | 6/2014 | Dassa et al. |
| 8,769,412 B2 | 7/2014 | Gill et al. |
| 8,781,169 B2 | 7/2014 | Jackson et al. |
| 8,782,794 B2 | 7/2014 | Ramcharran |
| 8,787,939 B2 | 7/2014 | Papakipos et al. |
| 8,788,405 B1 | 7/2014 | Sprague et al. |
| 8,788,407 B1 | 7/2014 | Singh et al. |
| 8,799,190 B2 | 8/2014 | Stokes et al. |
| 8,799,799 B2 | 8/2014 | Cervelli et al. |
| 8,799,812 B2 | 8/2014 | Parker |
| 8,812,960 B1 | 8/2014 | Sun et al. |
| 8,813,050 B2 | 8/2014 | Watters et al. |
| 8,818,892 B1 | 8/2014 | Sprague et al. |
| 8,830,322 B2 | 9/2014 | Nerayoff et al. |
| 8,832,594 B1 | 9/2014 | Thompson et al. |
| 8,832,832 B1 | 9/2014 | Visbal |
| 8,839,434 B2 | 9/2014 | McDougal et al. |
| 8,868,486 B2 | 10/2014 | Tamayo |
| 8,868,537 B1 | 10/2014 | Colgrove et al. |
| 8,917,274 B2 | 12/2014 | Ma et al. |
| 8,924,388 B2 | 12/2014 | Elliot et al. |
| 8,924,389 B2 | 12/2014 | Elliot et al. |
| 8,924,872 B1 | 12/2014 | Bogomolov et al. |
| 8,937,619 B2 | 1/2015 | Sharma et al. |
| 8,938,686 B1 | 1/2015 | Erenrich et al. |
| 8,949,283 B1* | 2/2015 | Cornwell ............... H04L 51/12 707/802 |
| 9,009,171 B1 | 4/2015 | Grossman et al. |
| 9,009,827 B1 | 4/2015 | Albertson et al. |
| 9,021,260 B1 | 4/2015 | Falk et al. |
| 9,021,384 B1 | 4/2015 | Beard et al. |
| 9,043,696 B1 | 5/2015 | Meiklejohn et al. |
| 9,043,894 B1 | 5/2015 | Dennison et al. |
| 9,047,441 B2 | 6/2015 | Xie et al. |
| 9,049,117 B1 | 6/2015 | Nucci et al. |
| 9,100,428 B1 | 8/2015 | Visbal |
| 9,116,975 B2 | 8/2015 | Shankar et al. |
| 9,135,658 B2 | 9/2015 | Sprague et al. |
| 9,165,299 B1 | 10/2015 | Stowe et al. |
| 9,171,334 B1 | 10/2015 | Visbal et al. |
| 9,177,014 B2 | 11/2015 | Gross |
| 9,177,344 B1 | 11/2015 | Singh et al. |
| 9,202,249 B1 | 12/2015 | Cohen et al. |
| 9,215,240 B2 | 12/2015 | Merza et al. |
| 9,230,280 B1 | 1/2016 | Maag et al. |
| 9,235,638 B2 | 1/2016 | Gattiker et al. |
| 9,256,664 B2 | 2/2016 | Chakerian et al. |
| 9,335,897 B2 | 5/2016 | Goldenberg |
| 9,338,013 B2 | 5/2016 | Castellucci et al. |
| 9,344,447 B2 | 5/2016 | Cohen et al. |
| 9,367,872 B1 | 6/2016 | Visbal et al. |
| 9,456,000 B1 | 9/2016 | Spiro et al. |
| 9,558,352 B1 | 1/2017 | Dennison et al. |
| 9,560,066 B2 | 1/2017 | Visbal |
| 9,635,046 B2 | 4/2017 | Spiro et al. |
| 10,135,863 B2 | 11/2018 | Dennison et al. |
| 10,230,746 B2 | 3/2019 | Visbal |
| 2001/0021936 A1 | 9/2001 | Bertram |
| 2002/0033848 A1 | 3/2002 | Sciammarella et al. |
| 2002/0065708 A1 | 5/2002 | Senay et al. |
| 2002/0091707 A1 | 7/2002 | Keller |
| 2002/0095360 A1 | 7/2002 | Joao |
| 2002/0095658 A1 | 7/2002 | Shulman |
| 2002/0103705 A1 | 8/2002 | Brady |
| 2002/0112157 A1 | 8/2002 | Doyle et al. |
| 2002/0116120 A1 | 8/2002 | Ruiz et al. |
| 2002/0130907 A1 | 9/2002 | Chi et al. |

(56) References Cited

U.S. PATENT DOCUMENTS

| | | |
|---|---|---|
| 2002/0147805 A1 | 10/2002 | Leshem et al. |
| 2002/0174201 A1 | 11/2002 | Ramer et al. |
| 2002/0194119 A1 | 12/2002 | Wright et al. |
| 2003/0028560 A1 | 2/2003 | Kudrolli et al. |
| 2003/0033228 A1 | 2/2003 | Bosworth-Davies et al. |
| 2003/0039948 A1 | 2/2003 | Donahue |
| 2003/0074368 A1 | 4/2003 | Schuetze et al. |
| 2003/0097330 A1 | 5/2003 | Hillmer et al. |
| 2003/0140106 A1 | 7/2003 | Raguseo |
| 2003/0144868 A1 | 7/2003 | MacIntyre et al. |
| 2003/0154044 A1 | 8/2003 | Lundstedt et al. |
| 2003/0163352 A1 | 8/2003 | Surpin et al. |
| 2003/0200217 A1 | 10/2003 | Ackerman |
| 2003/0225755 A1 | 12/2003 | Iwayama et al. |
| 2003/0229848 A1 | 12/2003 | Arend et al. |
| 2004/0032432 A1 | 2/2004 | Baynger |
| 2004/0034570 A1 | 2/2004 | Davis |
| 2004/0044912 A1 | 3/2004 | Connary et al. |
| 2004/0064256 A1 | 4/2004 | Barinek et al. |
| 2004/0085318 A1 | 5/2004 | Hassler et al. |
| 2004/0095349 A1 | 5/2004 | Bito et al. |
| 2004/0111410 A1 | 6/2004 | Burgoon et al. |
| 2004/0123139 A1 | 6/2004 | Aiello et al. |
| 2004/0126840 A1 | 7/2004 | Cheng et al. |
| 2004/0143602 A1 | 7/2004 | Ruiz et al. |
| 2004/0143796 A1 | 7/2004 | Lerner et al. |
| 2004/0153418 A1 | 8/2004 | Hanweck |
| 2004/0163039 A1 | 8/2004 | McPherson et al. |
| 2004/0181554 A1 | 9/2004 | Heckerman et al. |
| 2004/0193600 A1 | 9/2004 | Kaasten et al. |
| 2004/0205524 A1 | 10/2004 | Richter et al. |
| 2004/0221223 A1 | 11/2004 | Yu et al. |
| 2004/0250124 A1 | 12/2004 | Chesla et al. |
| 2004/0260702 A1 | 12/2004 | Cragun et al. |
| 2004/0267746 A1 | 12/2004 | Marcjan et al. |
| 2005/0010472 A1 | 1/2005 | Quatse et al. |
| 2005/0027705 A1 | 2/2005 | Sadri et al. |
| 2005/0028094 A1 | 2/2005 | Allyn |
| 2005/0039119 A1 | 2/2005 | Parks et al. |
| 2005/0065811 A1 | 3/2005 | Chu et al. |
| 2005/0080769 A1 | 4/2005 | Gemmell |
| 2005/0086207 A1 | 4/2005 | Heuer et al. |
| 2005/0108063 A1 | 5/2005 | Madill et al. |
| 2005/0125715 A1 | 6/2005 | Franco et al. |
| 2005/0157662 A1 | 7/2005 | Bingham et al. |
| 2005/0162523 A1 | 7/2005 | Darrell et al. |
| 2005/0166144 A1 | 7/2005 | Gross |
| 2005/0180330 A1 | 8/2005 | Shapiro |
| 2005/0182793 A1 | 8/2005 | Keenan et al. |
| 2005/0183005 A1 | 8/2005 | Denoue et al. |
| 2005/0204001 A1 | 9/2005 | Stein et al. |
| 2005/0210409 A1 | 9/2005 | Jou |
| 2005/0222928 A1 | 10/2005 | Steier et al. |
| 2005/0229256 A2 | 10/2005 | Banzhof |
| 2005/0234850 A1* | 10/2005 | Buchheit ............... G06Q 10/10 |
| 2005/0246327 A1 | 11/2005 | Yeung et al. |
| 2005/0251786 A1 | 11/2005 | Citron et al. |
| 2005/0262556 A1 | 11/2005 | Waisman et al. |
| 2005/0275638 A1 | 12/2005 | Kolmykov-Zotov et al. |
| 2006/0026120 A1 | 2/2006 | Carolan et al. |
| 2006/0026170 A1 | 2/2006 | Kreitler et al. |
| 2006/0026688 A1 | 2/2006 | Shah |
| 2006/0031928 A1 | 2/2006 | Conley et al. |
| 2006/0045470 A1 | 3/2006 | Poslinski et al. |
| 2006/0059139 A1 | 3/2006 | Robinson |
| 2006/0059238 A1 | 3/2006 | Slater et al. |
| 2006/0069912 A1 | 3/2006 | Zheng et al. |
| 2006/0074866 A1 | 4/2006 | Chamberlain et al. |
| 2006/0074881 A1 | 4/2006 | Vembu et al. |
| 2006/0080619 A1 | 4/2006 | Carlson et al. |
| 2006/0093222 A1 | 5/2006 | Saffer et al. |
| 2006/0095521 A1 | 5/2006 | Patinkin |
| 2006/0129746 A1 | 6/2006 | Porter |
| 2006/0139375 A1 | 6/2006 | Rasmussen et al. |
| 2006/0142949 A1 | 6/2006 | Helt |
| 2006/0143034 A1 | 6/2006 | Rothermel |
| 2006/0143075 A1 | 6/2006 | Carr et al. |
| 2006/0143079 A1 | 6/2006 | Basak et al. |
| 2006/0149596 A1 | 7/2006 | Surpin et al. |
| 2006/0179003 A1 | 8/2006 | Steele et al. |
| 2006/0203337 A1 | 9/2006 | White |
| 2006/0212931 A1 | 9/2006 | Shull et al. |
| 2006/0218637 A1 | 9/2006 | Thomas et al. |
| 2006/0241974 A1 | 10/2006 | Chao et al. |
| 2006/0242040 A1 | 10/2006 | Rader |
| 2006/0242630 A1 | 10/2006 | Koike et al. |
| 2006/0265747 A1 | 11/2006 | Judge |
| 2006/0271277 A1 | 11/2006 | Hu et al. |
| 2006/0279630 A1 | 12/2006 | Aggarwal et al. |
| 2007/0000999 A1 | 1/2007 | Kubo et al. |
| 2007/0011150 A1 | 1/2007 | Frank |
| 2007/0011304 A1 | 1/2007 | Error |
| 2007/0016363 A1 | 1/2007 | Huang et al. |
| 2007/0038646 A1 | 2/2007 | Thota |
| 2007/0038962 A1 | 2/2007 | Fuchs et al. |
| 2007/0057966 A1 | 3/2007 | Ohno et al. |
| 2007/0078832 A1 | 4/2007 | Ott et al. |
| 2007/0083541 A1 | 4/2007 | Fraleigh et al. |
| 2007/0094389 A1 | 4/2007 | Nussey et al. |
| 2007/0094500 A1 | 4/2007 | Shannon et al. |
| 2007/0106582 A1 | 5/2007 | Baker et al. |
| 2007/0143851 A1 | 6/2007 | Nicodemus |
| 2007/0150369 A1 | 6/2007 | Zivin |
| 2007/0174760 A1 | 7/2007 | Chamberlain et al. |
| 2007/0192265 A1 | 8/2007 | Chopin et al. |
| 2007/0198571 A1 | 8/2007 | Ferguson et al. |
| 2007/0208497 A1 | 9/2007 | Downs et al. |
| 2007/0208498 A1 | 9/2007 | Barker et al. |
| 2007/0208736 A1 | 9/2007 | Tanigawa et al. |
| 2007/0233709 A1 | 10/2007 | Abnous |
| 2007/0240062 A1 | 10/2007 | Christena et al. |
| 2007/0266336 A1 | 11/2007 | Nojima et al. |
| 2007/0284433 A1 | 12/2007 | Domenica et al. |
| 2007/0294200 A1 | 12/2007 | Au |
| 2007/0294643 A1 | 12/2007 | Kyle |
| 2007/0294766 A1 | 12/2007 | Mir et al. |
| 2008/0016216 A1 | 1/2008 | Worley et al. |
| 2008/0040684 A1 | 2/2008 | Crump |
| 2008/0051989 A1 | 2/2008 | Welsh |
| 2008/0052142 A1 | 2/2008 | Bailey et al. |
| 2008/0069081 A1 | 3/2008 | Chand et al. |
| 2008/0077597 A1 | 3/2008 | Butler |
| 2008/0077642 A1 | 3/2008 | Carbone et al. |
| 2008/0082486 A1 | 4/2008 | Lermant et al. |
| 2008/0104019 A1 | 5/2008 | Nath |
| 2008/0104407 A1 | 5/2008 | Horne et al. |
| 2008/0126951 A1 | 5/2008 | Sood et al. |
| 2008/0133567 A1 | 6/2008 | Ames et al. |
| 2008/0148398 A1 | 6/2008 | Mezack et al. |
| 2008/0155440 A1 | 6/2008 | Trevor et al. |
| 2008/0162616 A1 | 7/2008 | Gross et al. |
| 2008/0175266 A1 | 7/2008 | Alperovitch et al. |
| 2008/0195417 A1 | 8/2008 | Surpin et al. |
| 2008/0195608 A1 | 8/2008 | Clover |
| 2008/0201580 A1 | 8/2008 | Savitzky et al. |
| 2008/0222295 A1 | 9/2008 | Robinson et al. |
| 2008/0222706 A1 | 9/2008 | Renaud et al. |
| 2008/0229422 A1 | 9/2008 | Hudis et al. |
| 2008/0244742 A1 | 10/2008 | Neystadt et al. |
| 2008/0255973 A1 | 10/2008 | El Wade et al. |
| 2008/0263468 A1 | 10/2008 | Cappione et al. |
| 2008/0267107 A1 | 10/2008 | Rosenberg |
| 2008/0276167 A1 | 11/2008 | Michael |
| 2008/0278311 A1 | 11/2008 | Grange et al. |
| 2008/0288306 A1 | 11/2008 | MacIntyre et al. |
| 2008/0288425 A1 | 11/2008 | Posse et al. |
| 2008/0301643 A1 | 12/2008 | Appleton et al. |
| 2008/0313132 A1 | 12/2008 | Hao et al. |
| 2009/0002492 A1 | 1/2009 | Velipasalar et al. |
| 2009/0018940 A1 | 1/2009 | Wang et al. |
| 2009/0024505 A1 | 1/2009 | Patel et al. |
| 2009/0027418 A1 | 1/2009 | Maru et al. |
| 2009/0030915 A1 | 1/2009 | Winter et al. |
| 2009/0044279 A1 | 2/2009 | Crawford et al. |

(56) References Cited

U.S. PATENT DOCUMENTS

| | | |
|---|---|---|
| 2009/0055251 A1 | 2/2009 | Shah et al. |
| 2009/0076845 A1 | 3/2009 | Bellin et al. |
| 2009/0082997 A1 | 3/2009 | Tokman et al. |
| 2009/0083184 A1 | 3/2009 | Eisen |
| 2009/0088964 A1 | 4/2009 | Schaaf et al. |
| 2009/0094166 A1 | 4/2009 | Aymeloglu et al. |
| 2009/0103442 A1 | 4/2009 | Douville |
| 2009/0106178 A1 | 4/2009 | Chu |
| 2009/0112745 A1 | 4/2009 | Stefanescu |
| 2009/0119309 A1 | 5/2009 | Gibson et al. |
| 2009/0125359 A1 | 5/2009 | Knapic |
| 2009/0125369 A1 | 5/2009 | Kloosstra et al. |
| 2009/0125459 A1 | 5/2009 | Norton et al. |
| 2009/0132921 A1 | 5/2009 | Hwangbo et al. |
| 2009/0132953 A1 | 5/2009 | Reed et al. |
| 2009/0143052 A1 | 6/2009 | Bates et al. |
| 2009/0144262 A1 | 6/2009 | White et al. |
| 2009/0144274 A1 | 6/2009 | Fraleigh et al. |
| 2009/0164934 A1 | 6/2009 | Bhattiprolu et al. |
| 2009/0171939 A1 | 7/2009 | Athsani et al. |
| 2009/0172511 A1 | 7/2009 | Decherd et al. |
| 2009/0172821 A1 | 7/2009 | Daira et al. |
| 2009/0177962 A1 | 7/2009 | Gusmorino et al. |
| 2009/0179892 A1 | 7/2009 | Tsuda et al. |
| 2009/0187464 A1 | 7/2009 | Bai et al. |
| 2009/0187546 A1 | 7/2009 | Whyte et al. |
| 2009/0187548 A1 | 7/2009 | Ji et al. |
| 2009/0192957 A1 | 7/2009 | Subramanian et al. |
| 2009/0222400 A1 | 9/2009 | Kupershmidt et al. |
| 2009/0222759 A1 | 9/2009 | Drieschner |
| 2009/0222760 A1 | 9/2009 | Halverson et al. |
| 2009/0228701 A1 | 9/2009 | Lin |
| 2009/0234720 A1 | 9/2009 | George et al. |
| 2009/0249244 A1 | 10/2009 | Robinson et al. |
| 2009/0254970 A1 | 10/2009 | Agarwal et al. |
| 2009/0254971 A1 | 10/2009 | Herz |
| 2009/0271343 A1 | 10/2009 | Vaiciulis et al. |
| 2009/0271359 A1 | 10/2009 | Bayliss |
| 2009/0281839 A1 | 11/2009 | Lynn et al. |
| 2009/0287470 A1 | 11/2009 | Farnsworth et al. |
| 2009/0292626 A1 | 11/2009 | Oxford |
| 2009/0300589 A1 | 12/2009 | Watters et al. |
| 2009/0313463 A1 | 12/2009 | Pang et al. |
| 2009/0318775 A1 | 12/2009 | Michelson et al. |
| 2009/0319418 A1 | 12/2009 | Herz |
| 2009/0328222 A1 | 12/2009 | Helman et al. |
| 2010/0011282 A1 | 1/2010 | Dollard et al. |
| 2010/0042922 A1 | 2/2010 | Bradateanu et al. |
| 2010/0057622 A1 | 3/2010 | Faith et al. |
| 2010/0057716 A1 | 3/2010 | Stefik et al. |
| 2010/0070523 A1 | 3/2010 | Delgo et al. |
| 2010/0070842 A1 | 3/2010 | Aymeloglu et al. |
| 2010/0070845 A1 | 3/2010 | Facemire et al. |
| 2010/0070897 A1 | 3/2010 | Aymeloglu et al. |
| 2010/0077481 A1 | 3/2010 | Polyakov et al. |
| 2010/0077483 A1 | 3/2010 | Stolfo et al. |
| 2010/0098318 A1 | 4/2010 | Anderson |
| 2010/0100963 A1 | 4/2010 | Mahaffey |
| 2010/0103124 A1 | 4/2010 | Kruzeniski et al. |
| 2010/0106611 A1 | 4/2010 | Paulsen et al. |
| 2010/0114887 A1 | 5/2010 | Conway et al. |
| 2010/0122152 A1 | 5/2010 | Chamberlain et al. |
| 2010/0125546 A1 | 5/2010 | Barrett et al. |
| 2010/0131457 A1 | 5/2010 | Heimendinger |
| 2010/0162176 A1 | 6/2010 | Dunton |
| 2010/0169237 A1 | 7/2010 | Howard et al. |
| 2010/0185691 A1 | 7/2010 | Irmak et al. |
| 2010/0191563 A1 | 7/2010 | Schlaifer et al. |
| 2010/0198684 A1 | 8/2010 | Eraker et al. |
| 2010/0199225 A1 | 8/2010 | Coleman et al. |
| 2010/0211578 A1 | 8/2010 | Lundberg et al. |
| 2010/0228812 A1 | 9/2010 | Uomini |
| 2010/0235915 A1 | 9/2010 | Memon et al. |
| 2010/0250412 A1 | 9/2010 | Wagner |
| 2010/0262688 A1 | 10/2010 | Hussain et al. |
| 2010/0280857 A1 | 11/2010 | Liu et al. |
| 2010/0293174 A1 | 11/2010 | Bennett et al. |
| 2010/0306029 A1 | 12/2010 | Jolley |
| 2010/0306713 A1 | 12/2010 | Geisner et al. |
| 2010/0313119 A1 | 12/2010 | Baldwin et al. |
| 2010/0313266 A1 | 12/2010 | Feng et al. |
| 2010/0318924 A1 | 12/2010 | Frankel et al. |
| 2010/0321399 A1 | 12/2010 | Ellren et al. |
| 2010/0325526 A1 | 12/2010 | Ellis et al. |
| 2010/0325581 A1 | 12/2010 | Finkelstein et al. |
| 2010/0330801 A1 | 12/2010 | Rouh |
| 2011/0029526 A1 | 2/2011 | Knight et al. |
| 2011/0047159 A1 | 2/2011 | Baid et al. |
| 2011/0055140 A1 | 3/2011 | Roychowdhury |
| 2011/0060753 A1 | 3/2011 | Shaked et al. |
| 2011/0060910 A1 | 3/2011 | Gormish et al. |
| 2011/0061013 A1 | 3/2011 | Bilicki et al. |
| 2011/0066933 A1 | 3/2011 | Ludwig |
| 2011/0074811 A1 | 3/2011 | Hanson et al. |
| 2011/0078055 A1 | 3/2011 | Faribault et al. |
| 2011/0078173 A1 | 3/2011 | Seligmann et al. |
| 2011/0087519 A1 | 4/2011 | Fordyce, III et al. |
| 2011/0093327 A1 | 4/2011 | Fordyce, III et al. |
| 2011/0099133 A1 | 4/2011 | Chang et al. |
| 2011/0117878 A1 | 5/2011 | Barash et al. |
| 2011/0119100 A1 | 5/2011 | Ruhl et al. |
| 2011/0131122 A1 | 6/2011 | Griffin et al. |
| 2011/0137766 A1 | 6/2011 | Rasmussen et al. |
| 2011/0153384 A1 | 6/2011 | Horne et al. |
| 2011/0161096 A1 | 6/2011 | Buehler et al. |
| 2011/0167054 A1 | 7/2011 | Bailey et al. |
| 2011/0167105 A1 | 7/2011 | Ramakrishnan et al. |
| 2011/0167493 A1 | 7/2011 | Song et al. |
| 2011/0170799 A1 | 7/2011 | Carrino et al. |
| 2011/0173032 A1 | 7/2011 | Payne et al. |
| 2011/0173093 A1 | 7/2011 | Psota et al. |
| 2011/0178842 A1 | 7/2011 | Rane et al. |
| 2011/0185316 A1 | 7/2011 | Reid et al. |
| 2011/0202555 A1 | 8/2011 | Cordover et al. |
| 2011/0208724 A1 | 8/2011 | Jones et al. |
| 2011/0213655 A1 | 9/2011 | Henkin |
| 2011/0218934 A1 | 9/2011 | Elser |
| 2011/0219450 A1 | 9/2011 | McDougal et al. |
| 2011/0225198 A1 | 9/2011 | Edwards et al. |
| 2011/0225650 A1 | 9/2011 | Margolies et al. |
| 2011/0231223 A1 | 9/2011 | Winters |
| 2011/0238495 A1 | 9/2011 | Kang |
| 2011/0238510 A1 | 9/2011 | Rowen et al. |
| 2011/0238553 A1 | 9/2011 | Raj et al. |
| 2011/0238570 A1 | 9/2011 | Li et al. |
| 2011/0246229 A1 | 10/2011 | Pacha |
| 2011/0251951 A1 | 10/2011 | Kolkowtiz |
| 2011/0258158 A1 | 10/2011 | Resende et al. |
| 2011/0270604 A1 | 11/2011 | Qi et al. |
| 2011/0270705 A1 | 11/2011 | Parker |
| 2011/0289397 A1 | 11/2011 | Eastmond et al. |
| 2011/0289407 A1 | 11/2011 | Naik et al. |
| 2011/0289420 A1 | 11/2011 | Morioka et al. |
| 2011/0291851 A1 | 12/2011 | Whisenant |
| 2011/0307382 A1 | 12/2011 | Siegel et al. |
| 2011/0310005 A1 | 12/2011 | Chen et al. |
| 2011/0314007 A1 | 12/2011 | Dassa et al. |
| 2011/0314546 A1 | 12/2011 | Aziz et al. |
| 2012/0004904 A1 | 1/2012 | Shin et al. |
| 2012/0011238 A1 | 1/2012 | Rathod |
| 2012/0019559 A1 | 1/2012 | Siler et al. |
| 2012/0036013 A1 | 2/2012 | Neuhaus et al. |
| 2012/0036434 A1 | 2/2012 | Oberstein |
| 2012/0050293 A1 | 3/2012 | Carlhian et al. |
| 2012/0066166 A1 | 3/2012 | Curbera et al. |
| 2012/0066296 A1 | 3/2012 | Appleton et al. |
| 2012/0072825 A1 | 3/2012 | Sherkin et al. |
| 2012/0079363 A1 | 3/2012 | Folting et al. |
| 2012/0079592 A1 | 3/2012 | Pandrangi |
| 2012/0084118 A1 | 4/2012 | Bai et al. |
| 2012/0084135 A1 | 4/2012 | Nissan et al. |
| 2012/0084866 A1 | 4/2012 | Stolfo |
| 2012/0106801 A1 | 5/2012 | Jackson |
| 2012/0110633 A1 | 5/2012 | An et al. |

(56) References Cited

U.S. PATENT DOCUMENTS

| | | |
|---|---|---|
| 2012/0110674 A1 | 5/2012 | Belani et al. |
| 2012/0117082 A1 | 5/2012 | Koperda et al. |
| 2012/0124671 A1* | 5/2012 | Fritzson ............... G06F 21/577 726/26 |
| 2012/0131107 A1 | 5/2012 | Yost |
| 2012/0131512 A1 | 5/2012 | Takeuchi et al. |
| 2012/0137235 A1 | 5/2012 | TS et al. |
| 2012/0144335 A1 | 6/2012 | Abeln et al. |
| 2012/0158626 A1 | 6/2012 | Zhu et al. |
| 2012/0159307 A1 | 6/2012 | Chung et al. |
| 2012/0159362 A1 | 6/2012 | Brown et al. |
| 2012/0159399 A1 | 6/2012 | Bastide et al. |
| 2012/0169593 A1 | 7/2012 | Mak et al. |
| 2012/0170847 A1 | 7/2012 | Tsukidate |
| 2012/0173381 A1 | 7/2012 | Smith |
| 2012/0173985 A1 | 7/2012 | Peppel |
| 2012/0180002 A1 | 7/2012 | Campbell et al. |
| 2012/0196557 A1 | 8/2012 | Reich et al. |
| 2012/0196558 A1 | 8/2012 | Reich et al. |
| 2012/0197651 A1 | 8/2012 | Robinson et al. |
| 2012/0203708 A1 | 8/2012 | Psota et al. |
| 2012/0208636 A1 | 8/2012 | Feige |
| 2012/0215898 A1 | 8/2012 | Shah et al. |
| 2012/0218305 A1 | 8/2012 | Patterson et al. |
| 2012/0221511 A1 | 8/2012 | Gibson et al. |
| 2012/0221553 A1 | 8/2012 | Wittmer et al. |
| 2012/0221580 A1 | 8/2012 | Barney |
| 2012/0245976 A1 | 9/2012 | Kumar et al. |
| 2012/0246148 A1 | 9/2012 | Dror |
| 2012/0254129 A1 | 10/2012 | Wheeler et al. |
| 2012/0254947 A1 | 10/2012 | Dheap et al. |
| 2012/0266245 A1 | 10/2012 | McDougal et al. |
| 2012/0284345 A1 | 11/2012 | Costenaro et al. |
| 2012/0284791 A1 | 11/2012 | Miller et al. |
| 2012/0290879 A1 | 11/2012 | Shibuya et al. |
| 2012/0296907 A1 | 11/2012 | Long et al. |
| 2012/0304244 A1 | 11/2012 | Xie et al. |
| 2012/0310831 A1 | 12/2012 | Harris et al. |
| 2012/0310838 A1 | 12/2012 | Harris et al. |
| 2012/0311684 A1 | 12/2012 | Paulsen et al. |
| 2012/0323829 A1 | 12/2012 | Stokes et al. |
| 2012/0323888 A1 | 12/2012 | Osann, Jr. |
| 2012/0330801 A1 | 12/2012 | McDougal et al. |
| 2012/0330973 A1 | 12/2012 | Ghuneim et al. |
| 2013/0006426 A1 | 1/2013 | Healey et al. |
| 2013/0006655 A1 | 1/2013 | Van Arkel et al. |
| 2013/0006668 A1 | 1/2013 | Van Arkel et al. |
| 2013/0006725 A1 | 1/2013 | Simanek et al. |
| 2013/0006916 A1 | 1/2013 | McBride et al. |
| 2013/0018796 A1 | 1/2013 | Kolhatkar et al. |
| 2013/0019306 A1 | 1/2013 | Lagar-Cavilla et al. |
| 2013/0024268 A1 | 1/2013 | Manickavelu |
| 2013/0024307 A1 | 1/2013 | Fuerstenberg et al. |
| 2013/0024339 A1 | 1/2013 | Choudhuri et al. |
| 2013/0046635 A1 | 2/2013 | Grigg et al. |
| 2013/0046842 A1 | 2/2013 | Muntz et al. |
| 2013/0060786 A1 | 3/2013 | Serrano et al. |
| 2013/0061169 A1 | 3/2013 | Pearcy et al. |
| 2013/0073377 A1 | 3/2013 | Heath |
| 2013/0073454 A1 | 3/2013 | Busch |
| 2013/0078943 A1 | 3/2013 | Biage et al. |
| 2013/0086482 A1 | 4/2013 | Parsons |
| 2013/0096988 A1 | 4/2013 | Grossman et al. |
| 2013/0097482 A1 | 4/2013 | Marantz et al. |
| 2013/0097709 A1 | 4/2013 | Basavapatna et al. |
| 2013/0101159 A1 | 4/2013 | Chao et al. |
| 2013/0110822 A1 | 5/2013 | Ikeda et al. |
| 2013/0110876 A1 | 5/2013 | Meijer et al. |
| 2013/0110877 A1 | 5/2013 | Bonham et al. |
| 2013/0111320 A1 | 5/2013 | Campbell et al. |
| 2013/0117651 A1 | 5/2013 | Waldman et al. |
| 2013/0139261 A1 | 5/2013 | Friedrichs et al. |
| 2013/0139268 A1 | 5/2013 | An et al. |
| 2013/0150004 A1 | 6/2013 | Rosen |
| 2013/0151148 A1 | 6/2013 | Parundekar et al. |
| 2013/0151388 A1 | 6/2013 | Falkenborg et al. |
| 2013/0151453 A1 | 6/2013 | Bhanot et al. |
| 2013/0157234 A1 | 6/2013 | Gulli et al. |
| 2013/0160120 A1 | 6/2013 | Malaviya et al. |
| 2013/0166480 A1 | 6/2013 | Popescu et al. |
| 2013/0166550 A1 | 6/2013 | Buchmann et al. |
| 2013/0176321 A1 | 7/2013 | Mitchell et al. |
| 2013/0179420 A1 | 7/2013 | Park et al. |
| 2013/0185307 A1 | 7/2013 | El-Yaniv et al. |
| 2013/0185320 A1 | 7/2013 | Iwasaki et al. |
| 2013/0197925 A1 | 8/2013 | Blue |
| 2013/0211985 A1 | 8/2013 | Clark et al. |
| 2013/0224696 A1 | 8/2013 | Wolfe et al. |
| 2013/0225212 A1 | 8/2013 | Khan |
| 2013/0226318 A1 | 8/2013 | Procyk |
| 2013/0226953 A1 | 8/2013 | Markovich et al. |
| 2013/0232045 A1 | 9/2013 | Tai et al. |
| 2013/0238616 A1 | 9/2013 | Rose et al. |
| 2013/0239217 A1 | 9/2013 | Kindler et al. |
| 2013/0246170 A1 | 9/2013 | Gross et al. |
| 2013/0251233 A1 | 9/2013 | Yang et al. |
| 2013/0262527 A1 | 10/2013 | Hunter et al. |
| 2013/0263019 A1 | 10/2013 | Castellanos et al. |
| 2013/0267207 A1 | 10/2013 | Hao et al. |
| 2013/0268520 A1 | 10/2013 | Fisher et al. |
| 2013/0268994 A1 | 10/2013 | Cooper et al. |
| 2013/0276799 A1 | 10/2013 | Davidson |
| 2013/0279757 A1 | 10/2013 | Kephart |
| 2013/0282696 A1 | 10/2013 | John et al. |
| 2013/0290011 A1 | 10/2013 | Lynn et al. |
| 2013/0290825 A1 | 10/2013 | Arndt et al. |
| 2013/0297619 A1 | 11/2013 | Chandrasekaran et al. |
| 2013/0311375 A1 | 11/2013 | Priebatsch |
| 2013/0318594 A1 | 11/2013 | Hoy et al. |
| 2013/0339218 A1 | 12/2013 | Subramanian et al. |
| 2013/0339514 A1 | 12/2013 | Crank et al. |
| 2014/0006109 A1 | 1/2014 | Callioni et al. |
| 2014/0012796 A1 | 1/2014 | Petersen et al. |
| 2014/0013451 A1 | 1/2014 | Kulka et al. |
| 2014/0019936 A1 | 1/2014 | Cohanoff |
| 2014/0032506 A1 | 1/2014 | Hoey et al. |
| 2014/0033010 A1 | 1/2014 | Richardt et al. |
| 2014/0040371 A1 | 2/2014 | Gurevich et al. |
| 2014/0047319 A1 | 2/2014 | Eberlein |
| 2014/0047357 A1 | 2/2014 | Alfaro et al. |
| 2014/0058763 A1 | 2/2014 | Zizzamia et al. |
| 2014/0059038 A1 | 2/2014 | McPherson et al. |
| 2014/0059683 A1 | 2/2014 | Ashley |
| 2014/0067611 A1 | 3/2014 | Adachi et al. |
| 2014/0068487 A1 | 3/2014 | Steiger et al. |
| 2014/0074855 A1 | 3/2014 | Zhao et al. |
| 2014/0081652 A1 | 3/2014 | Klindworth |
| 2014/0082726 A1* | 3/2014 | Dreller ................. G06Q 10/04 726/23 |
| 2014/0095273 A1 | 4/2014 | Tang et al. |
| 2014/0095509 A1 | 4/2014 | Patton |
| 2014/0108068 A1 | 4/2014 | Williams |
| 2014/0108380 A1 | 4/2014 | Gotz et al. |
| 2014/0108985 A1 | 4/2014 | Scott et al. |
| 2014/0123279 A1 | 5/2014 | Bishop et al. |
| 2014/0129261 A1 | 5/2014 | Bothwell et al. |
| 2014/0136285 A1 | 5/2014 | Carvalho |
| 2014/0143009 A1 | 5/2014 | Brice et al. |
| 2014/0149130 A1 | 5/2014 | Getchius |
| 2014/0149272 A1 | 5/2014 | Hirani et al. |
| 2014/0149436 A1 | 5/2014 | Bahrami et al. |
| 2014/0156484 A1 | 6/2014 | Chan et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0173712 A1 | 6/2014 | Ferdinand |
| 2014/0173738 A1 | 6/2014 | Condry et al. |
| 2014/0188895 A1 | 7/2014 | Wang et al. |
| 2014/0189536 A1 | 7/2014 | Lange et al. |
| 2014/0195515 A1 | 7/2014 | Baker et al. |
| 2014/0195887 A1 | 7/2014 | Ellis et al. |
| 2014/0214579 A1 | 7/2014 | Shen et al. |
| 2014/0222521 A1 | 8/2014 | Chait |
| 2014/0222793 A1 | 8/2014 | Sadkin et al. |

(56) References Cited

U.S. PATENT DOCUMENTS

| | | |
|---|---|---|
| 2014/0229422 A1 | 8/2014 | Jain et al. |
| 2014/0244388 A1 | 8/2014 | Manouchehri et al. |
| 2014/0267294 A1 | 9/2014 | Ma |
| 2014/0267295 A1 | 9/2014 | Sharma |
| 2014/0279824 A1 | 9/2014 | Tamayo |
| 2014/0283067 A1 | 9/2014 | Call et al. |
| 2014/0283107 A1 | 9/2014 | Walton et al. |
| 2014/0310266 A1 | 10/2014 | Greenfield |
| 2014/0310282 A1 | 10/2014 | Sprague et al. |
| 2014/0316911 A1 | 10/2014 | Gross |
| 2014/0325643 A1 | 10/2014 | Bart et al. |
| 2014/0331119 A1 | 11/2014 | Dixon et al. |
| 2014/0333651 A1 | 11/2014 | Cervelli et al. |
| 2014/0337772 A1 | 11/2014 | Cervelli et al. |
| 2014/0344230 A1 | 11/2014 | Krause et al. |
| 2014/0366132 A1 | 12/2014 | Stiansen et al. |
| 2014/0379812 A1 | 12/2014 | Bastide, II et al. |
| 2015/0019394 A1 | 1/2015 | Unser et al. |
| 2015/0039565 A1 | 2/2015 | Lucas |
| 2015/0046791 A1 | 2/2015 | Isaacson |
| 2015/0046844 A1 | 2/2015 | Lee et al. |
| 2015/0046845 A1* | 2/2015 | Lee .................. G06F 3/0481 715/753 |
| 2015/0046870 A1 | 2/2015 | Goldenberg et al. |
| 2015/0046876 A1 | 2/2015 | Goldenberg |
| 2015/0067533 A1 | 3/2015 | Volach |
| 2015/0089424 A1 | 3/2015 | Duffield et al. |
| 2015/0100897 A1 | 4/2015 | Sun et al. |
| 2015/0100907 A1 | 4/2015 | Erenrich et al. |
| 2015/0106379 A1 | 4/2015 | Elliot et al. |
| 2015/0128274 A1 | 5/2015 | Giokas |
| 2015/0134666 A1 | 5/2015 | Gattiker et al. |
| 2015/0169709 A1 | 6/2015 | Kara et al. |
| 2015/0169726 A1 | 6/2015 | Kara et al. |
| 2015/0170077 A1 | 6/2015 | Kara et al. |
| 2015/0178825 A1 | 6/2015 | Huerta |
| 2015/0178877 A1 | 6/2015 | Bogomolov et al. |
| 2015/0186494 A1* | 7/2015 | Gilad .................. H04L 51/22 707/740 |
| 2015/0186821 A1 | 7/2015 | Wang et al. |
| 2015/0187036 A1 | 7/2015 | Wang et al. |
| 2015/0188715 A1 | 7/2015 | Castelluci et al. |
| 2015/0207809 A1 | 7/2015 | MacAulay |
| 2015/0223158 A1 | 8/2015 | McCann et al. |
| 2015/0227295 A1 | 8/2015 | Meiklejohn et al. |
| 2015/0229664 A1 | 8/2015 | Hawthorn et al. |
| 2015/0235334 A1 | 8/2015 | Wang et al. |
| 2015/0248563 A1 | 9/2015 | Alfarano et al. |
| 2015/0256498 A1 | 9/2015 | Snider et al. |
| 2015/0261847 A1 | 9/2015 | Ducott et al. |
| 2015/0309719 A1 | 10/2015 | Ma et al. |
| 2015/0317342 A1 | 11/2015 | Grossman et al. |
| 2015/0324868 A1 | 11/2015 | Kaftan et al. |
| 2015/0326601 A1 | 11/2015 | Grondin et al. |
| 2015/0347558 A1 | 12/2015 | Blaas et al. |
| 2016/0004764 A1 | 1/2016 | Chakerian et al. |
| 2016/0004864 A1 | 1/2016 | Falk et al. |
| 2016/0028759 A1 | 1/2016 | Visbal |
| 2016/0034470 A1 | 2/2016 | Sprague et al. |
| 2016/0048937 A1 | 2/2016 | Mathura et al. |
| 2017/0041335 A1 | 2/2017 | Spiro et al. |
| 2017/0134397 A1 | 5/2017 | Dennison et al. |
| 2017/0237755 A1 | 8/2017 | Visbal |
| 2019/0036945 A1 | 1/2019 | Dennison et al. |
| 2019/0158515 A1 | 5/2019 | Visbal |

FOREIGN PATENT DOCUMENTS

| | | |
|---|---|---|
| CN | 102054015 | 5/2014 |
| DE | 102014103482 | 9/2014 |
| DE | 102014204827 | 9/2014 |
| DE | 102014204830 | 9/2014 |
| DE | 102014204834 | 9/2014 |
| DE | 102014215621 | 2/2015 |
| EP | 1191463 | 3/2002 |
| EP | 1672527 | 6/2006 |
| EP | 1962222 | 8/2008 |
| EP | 2551799 | 1/2013 |
| EP | 2555153 | 2/2013 |
| EP | 2560134 | 2/2013 |
| EP | 2778977 | 9/2014 |
| EP | 2778983 | 9/2014 |
| EP | 2779082 | 9/2014 |
| EP | 2835745 | 2/2015 |
| EP | 2835770 | 2/2015 |
| EP | 2838039 | 2/2015 |
| EP | 2846241 | 3/2015 |
| EP | 2851852 | 3/2015 |
| EP | 2858014 | 4/2015 |
| EP | 2858018 | 4/2015 |
| EP | 2863326 | 4/2015 |
| EP | 2863346 | 4/2015 |
| EP | 2869211 | 5/2015 |
| EP | 2881868 | 6/2015 |
| EP | 2884439 | 6/2015 |
| EP | 2884440 | 6/2015 |
| EP | 2891992 | 7/2015 |
| EP | 2892197 | 7/2015 |
| EP | 2897051 | 7/2015 |
| EP | 2911078 | 8/2015 |
| EP | 2911100 | 8/2015 |
| EP | 2940603 | 11/2015 |
| EP | 2940609 | 11/2015 |
| EP | 2963577 | 1/2016 |
| EP | 2963578 | 1/2016 |
| EP | 2985729 | 2/2016 |
| EP | 2985974 | 2/2016 |
| EP | 3018879 | 5/2016 |
| EP | 3128449 | 12/2018 |
| GB | 2513247 | 10/2014 |
| GB | 2516155 | 1/2015 |
| GB | 2518745 | 4/2015 |
| NL | 2012778 | 11/2014 |
| NL | 2013306 | 2/2015 |
| NL | 2011642 | 8/2015 |
| NZ | 624557 | 12/2014 |
| WO | WO 00/009529 | 2/2000 |
| WO | WO 02/065353 | 8/2002 |
| WO | WO 2005/010685 | 2/2005 |
| WO | WO 2005/104736 | 11/2005 |
| WO | WO 2005/116851 | 12/2005 |
| WO | WO 2008/011728 | 1/2008 |
| WO | WO 2008/064207 | 5/2008 |
| WO | WO 2008/113059 | 9/2008 |
| WO | WO 2009/061501 | 5/2009 |
| WO | WO 2010/000014 | 1/2010 |
| WO | WO 2010/030913 | 3/2010 |
| WO | WO 2013/010157 | 1/2013 |
| WO | WO 2013/102892 | 7/2013 |
| WO | WO 2013/126281 | 8/2013 |

OTHER PUBLICATIONS

US 8,725,631 B1, 05/2014, Sprague et al. (withdrawn)
"A First Look: Predicting Market Demand for Food Retail using a Huff Analysis," TRF Policy Solutions, Jul. 2012, pp. 30.
"A Quick Guide to UniProtKB Swiss-Prot & TrEMBL," Sep. 2011, pp. 2.
"HunchLab: Heat Map and Kernel Density Calculation for Crime Analysis," Azavea Journal, printed from www.azavea.com/blogs/newsletter/v4i4/kernel-density-capabilities-added-to-hunchlab/ on Sep. 9, 2014, 2 pages.
"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.
"The FASTA Program Package," fasta-36.3.4, Mar. 25, 2011, pp. 29.
About 80 Minutes, "Palantir in a Number of Parts—Part 6—Graph," Mar. 21, 2013, pp. 1-6.
Acklen, Laura, "Absolute Beginner's Guide to Microsoft Word 2003," Dec. 24, 2003, pp. 15-18, 34-41, 308-316.

(56) References Cited

OTHER PUBLICATIONS

Alur et al., "Chapter 2: IBM InfoSphere DataStage Stages," IBM InfoSphere DataStage Data Flow and Job Design, Jul. 1, 2008, pp. 35-137.
Amnet, "5 Great Tools for Visualizing Your Twitter Followers," posted Aug. 4, 2010, http://www.amnetblog.com/component/content/article/115-5-grate-tools-for-visualizing-your-twitter-followers.html.
Ananiev et al., "The New Modality API," http://web.archive.org/web/20061211011958/http://java.sun.com/developer/technicalArticles/J2SE/Desktop/javase6/modality/ Jan. 21, 2006, pp. 8.
Appacts, "Smart Thinking for Super Apps," http://www.appacts.com Printed Jul. 18, 2013 in 4 pages.
Apsalar, "Data Powered Mobile Advertising," "Free Mobile App Analytics" and various analytics related screen shots http://apsalar.com Printed Jul. 18, 2013 in 8 pages.
Baker et al., "The Development of a Common Enumeration of Vulnerabilities and Exposures," Presented at the Second International Workshop on Recent Advances in Intrusion Detection, Sep. 7-9, 1999, pp. 35.
Bhuyan et al., "Network Anomaly Detection: Methods, Systems and Tools," First Quarter 2014, IEEE.
Bluttman et al., "Excel Formulas and Functions for Dummies," 2005, Wiley Publishing, Inc., pp. 280, 284-286.
Boyce, Jim, "Microsoft Outlook 2010 Inside Out," Aug. 1, 2010, retrieved from the internet https://capdtron.files.wordpress.com/2013/01/outlook-2010-inside_out.pdf.
Bugzilla@Mozilla, "Bug 18726—[feature] Long-click means of invoking contextual menus not supported," http://bugzilla.mozilla.org/show_bug.cgi?id=18726 printed Jun. 13, 2013 in 11 pages.
Canese et al., "Chapter 2: PubMed: The Bibliographic Database," The NCBI Handbook, Oct. 2002, pp. 1-10.
Capptain—Pilot Your Apps, http://www.capptain.com Printed Jul. 18, 2013 in 6 pages.
Celik, Tantek, "CSS Basic User Interface Module Level 3 (CSS3 UI)," Section 8 Resizing and Overflow, Jan. 17, 2012, retrieved from internet http://www.w3.org/TR/2012/WD-css3-ui-20120117/#resizing-amp-overflow retrieved on May 18, 2015.
Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.
Chung, Chin-Wan, "Dataplex: An Access to Heterogeneous Distributed Databases," Communications of the ACM, Association for Computing Machinery, Inc., vol. 33, No. 1, Jan. 1, 1990, pp. 70-80.
Conner, Nancy, "Google Apps: The Missing Manual," May 1, 2008, pp. 15.
Countly Mobile Analytics, http://count.ly/ Printed Jul. 18, 2013 in 9 pages.
Crosby et al., "Efficient Data Structures for Tamper-Evident Logging," Department of Computer Science, Rice University, 2009, pp. 17.
Definition "Identify", downloaded Jan. 22, 2015, 1 page.
Definition "Overlay", downloaded Jan. 22, 2015, 1 page.
Delcher et al., "Identifying Bacterial Genes and Endosymbiont DNA with Glimmer," BioInformatics, vol. 23, No. 6, 2007, pp. 673-679.
DISTIMO—App Analytics, http://www.distimo.com/app-analytics Printed Jul. 18, 2013 in 5 pages.
Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.
FireEye—Products and Solutions Overview, http://www.fireeye.com/products-and-solutions Printed Jun. 30, 2014 in 3 pages.
FireEye, http://www.fireeye.com/ Printed Jun. 30, 2014 in 2 pages.
Flurry Analytics, http://www.flurry.com/ Printed Jul. 18, 2013 in 14 pages.
Gesher, Ari, "Palantir Screenshots in the Wild: Swing Sightings," The Palantir Blog, Sep. 11, 2007, pp. 1-12.

GIS-NET 3 Public_Department of Regional Planning. Planning & Zoning Information for Unincorporated LA County. Retrieved Oct. 2, 2013 from http://gis.planning.lacounty.gov/GIS-NET3_Public/Viewer.html.
Glaab et al., "EnrichNet: Network-Based Gene Set Enrichment Analysis," Bioinformatics 28.18 (2012): pp. i451-i457.
Google Analytics Official Website—Web Analytics & Reporting, http://www.google.com/analytics.index.html Printed Jul. 18, 2013 in 22 pages.
Gorr et al., "Crime Hot Spot Forecasting: Modeling and Comparative Evaluation", Grant 98-IJ-CX-K005, May 6, 2002, 37 pages.
Goswami, Gautam, "Quite Writly Said!," One Brick at a Time, Aug. 21, 2005, pp. 7.
Griffith, Daniel A., "A Generalized Huff Model," Geographical Analysis, Apr. 1982, vol. 14, No. 2, pp. 135-144.
Gu et al., "Record Linkage: Current Practice and Future Directions," Jan. 15, 2004, pp. 32.
Hansen et al., "Analyzing Social Media Networks with NodeXL: Insights from a Connected World", Chapter 4, pp. 53-67 and Chapter 10, pp. 143-164, published Sep. 2010.
Hardesty, "Privacy Challenges: Analysis: It's Surprisingly Easy to Identify Individuals from Credit-Card Metadata," MIT News on Campus and Around the World, MIT News Office, Jan. 29, 2015, 3 pages.
Hibbert et al., "Prediction of Shopping Behavior Using a Huff Model Within a GIS Framework," Healthy Eating in Context, Mar. 18, 2011, pp. 16.
Hogue et al., "Thresher: Automating the Unwrapping of Semantic Content from the World Wide Web," 14th International Conference on World Wide Web, WWW 2005: Chiba, Japan, May 10-14, 2005, pp. 86-95.
Hua et al., "A Multi-attribute Data Structure with Parallel Bloom Filters for Network Services", HiPC 2006, LNCS 4297, pp. 277-288, 2006.
Huang et al., "Systematic and Integrative Analysis of Large Gene Lists Using DAVID Bioinformatics Resources," Nature Protocols, 4.1, 2008, 44-57.
Huff et al., "Calibrating the Huff Model Using ArcGIS Business Analyst," ESRI, Sep. 2008, pp. 33.
Huff, David L., "Parameter Estimation in the Huff Model," ESRI, ArcUser, Oct.-Dec. 2003, pp. 34-36.
Hur et al., "SciMiner: web-based literature mining tool for target identification and functional enrichment analysis," Bioinformatics 25.6 (2009): pp. 838-840.
Kahan et al., "Annotea: an Open RDF Infrastructure for Shared Web Annotations", Computer Networks, Elsevier Science Publishers B.V., vol. 39, No. 5, dated Aug. 5, 2002, pp. 589-608.
Kitts, Paul, "Chapter 14: Genome Assembly and Annotation Process," The NCBI Handbook, Oct. 2002, pp. 1-21.
Kontagent Mobile Analytics, http://www.kontagent.com/ Printed Jul. 18, 2013 in 9 pages.
Lee et al., "A Data Mining and CIDF Based Approach for Detecting Novel and Distributed Intrusions," Lecture Notes in Computer Science, vol. 1907 Nov. 11, 2000, pp. 49-65.
Li et al., "Interactive Multimodal Visual Search on Mobile Device," IEEE Transactions on Multimedia, vol. 15, No. 3, Apr. 1, 2013, pp. 594-607.
Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.
Localytics—Mobile App Marketing & Analytics, http://www.localytics.com/ Printed Jul. 18, 2013 in 12 pages.
Ma et al. "A New Approach to Secure Logging," ACM Transactions on Storage, vol. 5, No. 1, Article 2, Published Mar. 2009, 21 pages.
Madden, Tom, "Chapter 16: The BLAST Sequence Analysis Tool," The NCBI Handbook, Oct. 2002, pp. 1-15.
Manno et al., "Introducing Collaboration in Single-user Applications through the Centralized Control Architecture," 2010, pp. 10.
Manske, "File Saving Dialogs," http://www.mozilla.org/editor/ui_specs/FileSaveDialogs.html, Jan. 20, 1999, pp. 7.

(56) References Cited

OTHER PUBLICATIONS

Map Builder, "Rapid Mashup Development Tool for Google and Yahoo Maps!" http://web.archive.org/web/20090626224734/http://www.mapbuilder.net/ printed Jul. 20, 2012 in 2 pages.
Map of San Jose, CA. Retrieved Oct. 2, 2013 from http://maps.yahoo.com.
Map of San Jose, CA. Retrieved Oct. 2, 2013 from http://maps.bing.com.
Map of San Jose, CA. Retrieved Oct. 2, 2013 from http://maps.google.com.
Microsoft—Developer Network, "Getting Started with VBA in Word 2010," Apr. 2010, http://msdn.microsoft.com/en-us/library/ff604039%28v=office.14%29.aspx as printed Apr. 4, 2014 in 17 pages.
Microsoft Office—Visio, "About connecting shapes," http://office.microsoft.com/en-us/visio-help/about-connecting-shapes-HP085050369.aspx printed Aug. 4, 2011 in 6 pages.
Microsoft Office—Visio, "Add and glue connectors with the Connector tool," http://office.microsoft.com/en-us/visio-help/add-and-glue-connectors-with-the-connector-tool-HA010048532.aspx?CTT=1 printed Aug. 4, 2011 in 1 page.
Mixpanel—Mobile Analytics, https://mixpanel.com/ Printed Jul. 18, 2013 in 13 pages.
Mizrachi, Ilene, "Chapter 1: GenBank: The Nuckeotide Sequence Database," The NCBI Handbook, Oct. 2002, pp. 1-14.
Nierman, "Evaluating Structural Similarity in XML Documents", 6 pages, 2002.
Olanoff, Drew, "Deep Dive with the New Google Maps for Desktop with Google Earth Integration, It's More than Just a Utility," May 15, 2013, pp. 1-6, retrieved from the internet: http://web.archive.org/web/20130515230641/http://techcrunch.com/2013/05/15/deep-dive-with-the-new-google-maps-for-desktop-with-google-earth-integration-its-more-than-just-a-utility/.
Open Web Analytics (OWA), http://www.openwebanalytics.com/ Printed Jul. 19, 2013 in 5 pages.
Palantir Technologies, "Palantir Labs Timeline," Oct. 1, 2010, retrieved from the internet https://www.youtube.com/watch?v=JCgDW5bru9M.
Palmas et al., "An Edge-Bunding Layout for Interactive Parallel Coordinates" 2014 IEEE Pacific Visualization Symposium, pp. 57-64.
Piwik—Free Web Analytics Software. http://piwik.org/ Printed Jul. 19, 2013 in18 pages.
QUEST, "Toad for ORACLE 11.6—Guide to Using Toad," Sep. 24, 2012, pp. 1-162.
Rouse, Margaret, "OLAP Cube," http://searchdatamanagement.techtarget.com/definition/OLAP-cube, Apr. 28, 2012, pp. 16.
Schneier et al., "Automatic Event Stream Notarization Using Digital Signatures," Security Protocols, International Workshop Apr. 1996 Proceedings, Springer-Veriag, 1997, pp. 155-169, https://schneier.com/paper-event-stream.pdf.
Schneier et al., "Cryptographic Support for Secure Logs on Untrusted Machines," The Seventh USENIX Security Symposium Proceedings, USENIX Press, Jan. 1998, pp. 53-62, https://www.schneier.com/paper-secure-logs.pdf.
Sigrist, et al., "PROSITE, a Protein Domain Database for Functional Characterization and Annotation," Nucleic Acids Research, 2010, vol. 38, pp. D161-D166.
Sirotkin et al., "Chapter 13: The Processing of Biological Sequence Data at NCBI," The NCBI Handbook, Oct. 2002, pp. 1-11.
StatCounter—Free Invisible Web Tracker, Hit Counter and Web Stats, http://statcounter.com/ Printed Jul. 19, 2013 in 17 pages.
TestFlight—Beta Testing on the Fly, http://testflightapp.com/ Printed Jul. 18, 2013 in 3 pages.
Thompson, Mick, "Getting Started with GEO," Getting Started with GEO, Jul. 26, 2011.
trak.io, http://trak.io/ printed Jul. 18, 2013 in 3 pages.
Umagandhi et al., "Search Query Recommendations Using Hybrid User Profile with Query Logs," International Journal of Computer Applications, vol. 80, No. 10, Oct. 1, 2013, pp. 7-18.
UserMetrix, http://usermetrix.com/android-analytics printed Jul. 18, 2013 in 3 pages.
Valentini et al., "Ensembles of Learning Machines", M. Marinaro and R. Tagliaferri (Eds.): WIRN VIETRI 2002, LNCS 2486, pp. 3-20.
VirusTotal—About, http://www.virustotal.com/en/about/ Printed Jun. 30, 2014 in 8 pages.
Vose et al., "Help File for ModelRisk Version 5," 2007, Vose Software, pp. 349-353. [Uploaded in 2 Parts].
Waters et al., "Building an Encrypted and Searchable Audit Log," Published Jan. 9, 2004, 11 pages, http://www.parc.com/content/attachments/building_encrypted_searchable_5059_parc.pdf.
Wikipedia, "Federated Database System," Sep. 7, 2013, retrieved from the internet on Jan. 27, 2015 http://en.wikipedia.org/w/index.php?title-Federated_database_system&oldid=571954221.
Wright et al., "Palantir Technologies VAST 2010 Challenge Text Records_Investigations into Arms Dealing," Oct. 29, 2010, pp. 1-10.
Yang et al., "HTML Page Analysis Based on Visual Cues", A129, pp. 859-864, 2001.
Zheng et al., "GOEAST: a web-based software toolkit for Gene Ontology enrichment analysis," Nucleic acids research 36.suppl 2 (2008): pp. W385-W363.
International Search Report and Written Opinion in Application No. PCT/US2009/056703, dated Mar. 15, 2010.
Notice of Acceptance for Australian Patent Application No. 2014250678 dated Oct. 7, 2015.
Notice of Allowance for U.S. Appl. No. 12/556,318 dated Nov. 2, 2015.
Notice of Allowance for U.S. Appl. No. 14/033,076 dated Mar. 11, 2016.
Notice of Allowance for U.S. Appl. No. 14/102,394 dated Aug. 25, 2014.
Notice of Allowance for U.S. Appl. No. 14/108,187 dated Aug. 29, 2014.
Notice of Allowance for U.S. Appl. No. 14/135,289 dated Oct. 14, 2014.
Notice of Allowance for U.S. Appl. No. 14/148,568 dated Aug. 26, 2015.
Notice of Allowance for U.S. Appl. No. 14/192,767 dated Dec. 16, 2014.
Notice of Allowance for U.S. Appl. No. 14/223,918 dated Jan. 6, 2016.
Notice of Allowance for U.S. Appl. No. 14/225,084 dated May 4, 2015.
Notice of Allowance for U.S. Appl. No. 14/268,964 dated Dec. 3, 2014.
Notice of Allowance for U.S. Appl. No. 14/294,098 dated Dec. 29, 2014.
Notice of Allowance for U.S. Appl. No. 14/326,738 dated Nov. 18, 2015.
Notice of Allowance for U.S. Appl. No. 14/479,863 dated Mar. 31, 2015.
Notice of Allowance for U.S. Appl. No. 14/504,103 dated May 18, 2015.
Notice of Allowance for U.S. Appl. No. 14/698,432 dated Sep. 28, 2016.
Notice of Allowance for U.S. Appl. No. 14/816,748 dated Oct. 19, 2016.
Notice of Allowance for U.S. Appl. No. 14/823,935 dated Apr. 25, 2016.
Notice of Allowance for U.S. Appl. No. 14/970,317 dated May 26, 2016.
Notice of Allowance for U.S. Appl. No. 15/072,174 dated Jul. 13, 2016.
Official Communication for Australian Patent Application No. 2014201511 dated Feb. 27, 2015.
Official Communication for Australian Patent Application No. 2014202442 dated Mar. 19, 2015.
Official Communication for Australian Patent Application No. 2014210604 dated Jun. 5, 2015.
Official Communication for Australian Patent Application No. 2014210614 dated Jun. 5, 2015.

(56) References Cited

OTHER PUBLICATIONS

Official Communication for Australian Patent Application No. 2014213553 dated May 7, 2015.
Official Communication for Australian Patent Application No. 2014250678 dated Jun. 17, 2015.
Official Communication for European Patent Application No. 14158861.6 dated Jun. 16, 2014.
Official Communication for European Patent Application No. 14159464.8 dated Jul. 31, 2014.
Official Communication for European Patent Application No. 14180142.3 dated Feb. 6, 2015.
Official Communication for European Patent Application No. 14180281.9 dated Jan. 26, 2015.
Official Communication for European Patent Application No. 14180321.3 dated Apr. 17, 2015.
Official Communication for European Patent Application No. 14180432.8 dated Jun. 23, 2015.
Official Communication for European Patent Application No. 14186225.0 dated Feb. 13, 2015.
Official Communication for European Patent Application No. 14187739.9 dated Jul. 6, 2015.
Official Communication for European Patent Application No. 14187996.5 dated Feb. 12, 2015.
Official Communication for European Patent Application No. 14189344.6 dated Feb. 20, 2015.
Official Communication for European Patent Application No. 14189347.9 dated Mar. 4, 2015.
Official Communication for European Patent Application No. 14189802.3 dated May 11, 2015.
Official Communication for European Patent Application No. 14191540.5 dated May 27, 2015.
Official Communication for European Patent Application No. 14197879.1 dated Apr. 28, 2015.
Official Communication for European Patent Application No. 14197895.7 dated Apr. 28, 2015.
Official Communication for European Patent Application No. 14197938.5 dated Apr. 28, 2015.
Official Communication for European Patent Application No. 14199180.2 dated Jun. 22, 2015.
Official Communication for European Patent Application No. 14199180.2 dated Aug. 31, 2015.
Official Communication for European Patent Application No. 14199182.8 dated Mar. 13, 2015.
Official Communication for European Patent Application No. 15155846.7 dated Jul. 8, 2015.
Official Communication for European Patent Application No. 15165244.3 dated Aug. 27, 2015.
Official Communication for European Patent Application No. 15175106.2 dated Nov. 5, 2015.
Official Communication for European Patent Application No. 15180985.2 dated Jan. 15, 2016.
Official Communication for European Patent Application No. 15183721.8 dated Nov. 23, 2015.
Official Communication for Great Britain Application No. 1413935.9 dated Jan. 27, 2015.
Official Communication for Great Britain Patent Application No. 1404486.1 dated May 21, 2015.
Official Communication for Great Britain Patent Application No. 1404486.1 dated Aug. 27, 2014.
Official Communication for Great Britain Patent Application No. 1404489.5 dated May 21, 2015.
Official Communication for Great Britain Patent Application No. 1404489.5 dated Aug. 27, 2014.
Official Communication for Great Britain Patent Application No. 1404499.4 dated Aug. 20, 2014.
Official Communication for Great Britain Patent Application No. 1404574.4 dated Dec. 18, 2014.
Official Communication for Great Britain Patent Application No. 1408025.3 dated Nov. 6, 2014.
Official Communication for Great Britain Patent Application No. 1411984.6 dated Dec. 22, 2014.
Official Communication for Great Britain Patent Application No. 1413935.6 dated Jan. 27, 2015.
Official Communication for Netherlands Patent Application No. 2012437 dated Sep. 18, 2015.
Official Communication for Netherlands Patent Application No. 2013306 dated Apr. 24, 2015.
Official Communication for New Zealand Patent Application No. 622181 dated Mar. 24, 2014.
Official Communication for New Zealand Patent Application No. 622439 dated Mar. 24, 2014.
Official Communication for New Zealand Patent Application No. 622439 dated Jun. 6, 2014.
Official Communication for New Zealand Patent Application No. 622473 dated Jun. 19, 2014.
Official Communication for New Zealand Patent Application No. 622473 dated Mar. 27, 2014.
Official Communication for New Zealand Patent Application No. 622513 dated Apr. 3, 2014.
Official Communication for New Zealand Patent Application No. 622517 dated Apr. 3, 2014.
Official Communication for New Zealand Patent Application No. 624557 dated May 14, 2014.
Official Communication for New Zealand Patent Application No. 627061 dated Jul. 14, 2014.
Official Communication for New Zealand Patent Application No. 627962 dated Aug. 5, 2014.
Official Communication for New Zealand Patent Application No. 628150 dated Aug. 15, 2014.
Official Communication for New Zealand Patent Application No. 628161 dated Aug. 25, 2014.
Official Communication for New Zealand Patent Application No. 628263 dated Aug. 12, 2014.
Official Communication for New Zealand Patent Application No. 628495 dated Aug. 19, 2014.
Official Communication for New Zealand Patent Application No. 628585 dated Aug. 26, 2014.
Official Communication for New Zealand Patent Application No. 628840 dated Aug. 28, 2014.
Official Communication for U.S. Appl. No. 12/556,318 dated Jul. 2, 2015.
Official Communication for U.S. Appl. No. 13/247,987 dated Apr. 2, 2015.
Official Communication for U.S. Appl. No. 13/247,987 dated Sep. 22, 2015.
Official Communication for U.S. Appl. No. 13/827,491 dated Dec. 1, 2014.
Official Communication for U.S. Appl. No. 13/831,791 dated Mar. 4, 2015.
Official Communication for U.S. Appl. No. 13/831,791 dated Aug. 6, 2015.
Official Communication for U.S. Appl. No. 13/835,688 dated Jun. 17, 2015.
Official Communication for U.S. Appl. No. 13/839,026 dated Aug. 4, 2015.
Official Communication for U.S. Appl. No. 14/134,558 dated Oct. 7, 2015.
Official Communication for U.S. Appl. No. 14/148,568 dated Oct. 22, 2014.
Official Communication for U.S. Appl. No. 14/148,568 dated Mar. 26, 2015.
Official Communication for U.S. Appl. No. 14/196,814 dated May 5, 2015.
Official Communication for U.S. Appl. No. 14/223,918 dated Jun. 8, 2015.
Official Communication for U.S. Appl. No. 14/225,006 dated Sep. 10, 2014.
Official Communication for U.S. Appl. No. 14/225,006 dated Sep. 2, 2015.
Official Communication for U.S. Appl. No. 14/225,006 dated Feb. 27, 2015.

(56) References Cited

OTHER PUBLICATIONS

Official Communication for U.S. Appl. No. 14/225,084 dated Sep. 11, 2015.
Official Communication for U.S. Appl. No. 14/225,084 dated Sep. 2, 2014.
Official Communication for U.S. Appl. No. 14/225,084 dated Feb. 20, 2015.
Official Communication for U.S. Appl. No. 14/225,160 dated Feb. 11, 2015.
Official Communication for U.S. Appl. No. 14/225,160 dated Aug. 12, 2015.
Official Communication for U.S. Appl. No. 14/225,160 dated May 20, 2015.
Official Communication for U.S. Appl. No. 14/225,160 dated Oct. 22, 2014.
Official Communication for U.S. Appl. No. 14/225,160 dated Jul. 29, 2014.
Official Communication for U.S. Appl. No. 14/268,964 dated Sep. 3, 2014.
Official Communication for U.S. Appl. No. 14/280,490 dated Jul. 24, 2014.
Official Communication for U.S. Appl. No. 14/289,596 dated Jul. 18, 2014.
Official Communication for U.S. Appl. No. 14/289,596 dated Jan. 26, 2015.
Official Communication for U.S. Appl. No. 14/289,596 dated Apr. 30, 2015.
Official Communication for U.S. Appl. No. 14/289,599 dated Jul. 22, 2014.
Official Communication for U.S. Appl. No. 14/289,599 dated May 29, 2015.
Official Communication for U.S. Appl. No. 14/289,599 dated Sep. 4, 2015.
Official Communication for U.S. Appl. No. 14/294,098 dated Aug. 15, 2014.
Official Communication for U.S. Appl. No. 14/294,098 dated Nov. 6, 2014.
Official Communication for U.S. Appl. No. 14/306,138 dated Sep. 14, 2015.
Official Communication for U.S. Appl. No. 14/306,138 dated Feb. 18, 2015.
Official Communication for U.S. Appl. No. 14/306,138 dated Sep. 23, 2014.
Official Communication for U.S. Appl. No. 14/306,138 dated May 26, 2015.
Official Communication for U.S. Appl. No. 14/306,138 dated Dec. 3, 2015.
Official Communication for U.S. Appl. No. 14/306,147 dated Feb. 19, 2015.
Official Communication for U.S. Appl. No. 14/306,147 dated Aug. 7, 2015.
Official Communication for U.S. Appl. No. 14/306,147 dated Sep. 9, 2014.
Official Communication for U.S. Appl. No. 14/306,154 dated Mar. 11, 2015.
Official Communication for U.S. Appl. No. 14/306,154 dated May 15, 2015.
Official Communication for U.S. Appl. No. 14/306,154 dated Nov. 16, 2015.
Official Communication for U.S. Appl. No. 14/306,154 dated Jul. 6, 2015.
Official Communication for U.S. Appl. No. 14/306,154 dated Sep. 9, 2014.
Official Communication for U.S. Appl. No. 14/319,161 dated Jan. 23, 2015.
Official Communication for U.S. Appl. No. 14/319,765 dated Sep. 10, 2015.
Official Communication for U.S. Appl. No. 14/319,765 dated Jun. 16, 2015.
Official Communication for U.S. Appl. No. 14/319,765 dated Nov. 25, 2014.
Official Communication for U.S. Appl. No. 14/319,765 dated Feb. 4, 2015.
Official Communication for U.S. Appl. No. 14/326,738 dated Dec. 2, 2014.
Official Communication for U.S. Appl. No. 14/326,738 dated Jul. 31, 2015.
Official Communication for U.S. Appl. No. 14/326,738 dated Mar. 31, 2015.
Official Communication for U.S. Appl. No. 14/451,221 dated Oct. 21, 2014.
Official Communication for U.S. Appl. No. 14/463,615 dated Nov. 13, 2014.
Official Communication for U.S. Appl. No. 14/463,615 dated May 21, 2015.
Official Communication for U.S. Appl. No. 14/463,615 dated Jan. 28, 2015.
Official Communication for U.S. Appl. No. 14/479,863 dated Dec. 26, 2014.
Official Communication for U.S. Appl. No. 14/483,527 dated Jan. 28, 2015.
Official Communication for U.S. Appl. No. 14/490,612 dated Aug. 18, 2015.
Official Communication for U.S. Appl. No. 14/490,612 dated Jan. 27, 2015.
Official Communication for U.S. Appl. No. 14/490,612 dated Mar. 31, 2015.
Official Communication for U.S. Appl. No. 14/504,103 dated Mar. 31, 2015.
Official Communication for U.S. Appl. No. 14/504,103 dated Feb. 5, 2015.
Official Communication for U.S. Appl. No. 14/571,098 dated Mar. 11, 2015.
Official Communication for U.S. Appl. No. 14/631,633 dated Sep. 10, 2015.
Official Communication for U.S. Appl. No. 14/731,312 dated Apr. 14, 2016.
Official Communication for U.S. Appl. No. 14/813,749 dated Sep. 28, 2015.
Official Communication for U.S. Appl. No. 14/816,748 dated Apr. 1, 2016.
Official Communication for U.S. Appl. No. 14/816,748 dated May 24, 2016.
Official Communication for U.S. Appl. No. 14/823,935 dated Dec. 4, 2015.
Official Communication for U.S. Appl. No. 14/923,712 dated Feb. 12, 2016.
Official Communication for U.S. Appl. No. 14/970,317 dated Mar. 21, 2016.
Official Communication for U.S. Appl. No. 14/982,699 dated Mar. 25, 2016.
Official Communication for U.S. Appl. No. 15/071,064 dated Jun. 16, 2016.
Official Communication for U.S. Appl. No. 15/253,717 dated Dec. 1, 2016.
Restriction Requirement for U.S. Appl. No. 13/839,026 dated Apr. 2, 2015.
"A Word About Banks and the Laundering of Drug Money," Aug. 18, 2012, http://www.golemxiv.co.uk/2012/08/a-word-about-banks-and-the-laundering-of-drug-money/.
"Money Laundering Risks and E-Gaming: A European Overview and Assessment," 2009, http://www.cf.ac.uk/socsi/resources/Levi_Final_Money_Laundering_Risks_egaming.pdf.
"Potential Money Laundering Warning Signs," snapshot taken 2003, https://web.archive.org/web/20030816090055/http:/finsolinc.com/ANTI-MONEY%20LAUNDERING%20TRAINING%20GUIDES.pdf.
"Using Whois Based Geolocation and Google Maps API for Support Cybercrime Investigations," http://wseas.us/e-library/conferences/2013/Dubrovnik/TELECIRC/TELECIRC-32.pdf.

(56) References Cited

OTHER PUBLICATIONS

Alfred, Rayner "Summarizing Relational Data Using Semi-Supervised Genetic Algorithm-Based Clustering Techniques", Journal of Computer Science, 2010, vol. 6, No. 7, pp. 775-784.
Bhosale, Safal V., "Holy Grail of Outlier Detection Technique: A Macro Level Take on the State of the Art," International Journal of Computer Science & Information Technology, Aug. 1, 2014, retrieved from http://www.ijcsit.com/docs/Volume5/vol5issue04/ijcsit20140504226.pdf retrieved May 3, 2016.
Golmohammadi et al., "Data Mining Applications for Fraud Detection in Securities Market," Intelligence and Security Informatics Conference (EISIC), 2012 European, IEEE, Aug. 22, 2012, pp. 107-114.
Gu et al., "BotMiner: Clustering Analysis of Network Traffice for Protocol-and-Structure-Independent Botnet Detection," USENIX Security Symposium, 2008, 17 pages.
Hodge et al., "A Survey of Outlier Detection Methodologies," Artificial Intelligence Review, vol. 22, No. 2, Oct. 1, 2004.
Keylines.com, "An Introduction to KeyLines and Network Visualization," Mar. 2014, http://keylines.com/wp-content/uploads/2014/03/KeyLines-White-Paper.pdf downloaded May 12, 2014 in 8 pages.
Keylines.com, "KeyLines Datasheet," Mar. 2014, http://keylines.com/wp-content/uploads/2014/03/KeyLines-datasheet.pdf downloaded May 12, 2014 in 2 pages.
Keylines.com, "Visualizing Threats: Improved Cyber Security Through Network Visualization," Apr. 2014, http://keylines.com/wp-content/uploads/2014/04/Visualizing-Threats1.pdf downloaded May 12, 2014 in 10 pages.
Li et al., "Identifying the Signs of Fraudulent Accounts using Data Mining Techniques," Computers in Human Behavior, vol. 28, No. 3, Jan. 16, 2012.
Ngai et al., "The Application of Data Mining Techniques in Financial Fraud Detection: A Classification Frameworok and an Academic Review of Literature," Decision Support Systems, Elsevier Science Publishers, Amsterdam, Netherlands, vol. 50, No. 3, Feb. 1, 2011.
Nolan et al., "MCARTA: A Malicious Code Automated Run-Time Analysis Framework," Homeland Security (HST) 2012 IEEE Conference on Technologies for, Nov. 13, 2012, pp. 13-17.
Perdisci et al., "Behavioral Clustering of HTTP-Based Malware and Signature Generation Using Malicious Network Traces," USENIX, Mar. 18, 2010, pp. 1-14.
Quartert FS "Managing Business Performance and Detecting Outliers in Financial Services," Oct. 16, 2014, retrieved from https://quartetfs.com/images/pdf/white-papers/Quartet_FS_White_Paper_-_ActivePivot_Sentinel.pdf retrieved on May 3, 2016.
Quartert FS "Resource Center," Oct. 16, 2014, retrieved from https://web.archive.org/web/20141016044306/http://quartetfs.com/resource-center/white-papers retrieved May 3, 2016.
Shah, Chintan, "Periodic Connections to Control Server Offer New Way to Detect Botnets," Oct. 24, 2013 in 6 pages, http://www.blogs.mcafee.com/mcafee-labs/periodic-links-to-control-server-offer-new-way-to-detect-botnets.
Shi et al., "A Scalable Implementation of Malware Detection Based on Network Connection Behaviors," 2013 International Conference on Cyber-Enabled Distributed Computing and Knowledge Discovery, IEEE, Oct. 10, 2013, pp. 59-66.
Symantec Corporation, "E-Security Begins with Sound Security Policies," Announcement Symantec, Jun. 14, 2001.
Wiggerts, T.A., "Using Clustering Algorithms in Legacy Systems Remodularization," Reverse Engineering, Proceedings of the Fourth Working Conference, Netherlands, Oct. 6-8, 1997, IEEE Computer Soc., pp. 33-43.
Notice of Allowance for U.S. Appl. No. 14/139,628 dated Jun. 24, 2015.
Notice of Allowance for U.S. Appl. No. 14/139,640 dated Jun. 17, 2015.
Notice of Allowance for U.S. Appl. No. 14/139,713 dated Jun. 12, 2015.
Notice of Allowance for U.S. Appl. No. 14/264,445 dated May 14, 2015.
Notice of Allowance for U.S. Appl. No. 14/278,963 dated Sep. 2, 2015.
Notice of Allowance for U.S. Appl. No. 14/323,935 dated Oct. 1, 2015.
Notice of Allowance for U.S. Appl. No. 14/473,552 dated Jul. 24, 2015.
Notice of Allowance for U.S. Appl. No. 14/473,860 dated Feb. 27, 2015.
Notice of Allowance for U.S. Appl. No. 14/473,860 dated Jan. 5, 2015.
Notice of Allowance for U.S. Appl. No. 14/486,991 dated May 1, 2015.
Notice of Allowance for U.S. Appl. No. 14/579,752 dated Apr. 4, 2016.
Notice of Allowance for U.S. Appl. No. 14/616,080 dated Apr. 2, 2015.
Official Communication for European Patent Application No. 14159535.5 dated May 22, 2014.
Official Communication for European Patent Application No. 15155845.9 dated Oct. 6, 2015.
Official Communication for European Patent Application No. 15156004.2 dated Aug. 24, 2015.
Official Communication for European Patent Application No. 15175151.8 dated Nov. 25, 2015.
Official Communication for European Patent Application No. 15175171.8 dated Nov. 25, 2015.
Official Communication for European Patent Application No. 15180515.7 dated Dec. 14, 2015.
Official Communication for European Patent Application No. 15193287.8 dated Apr. 1, 2016.
Official Communication for European Patent Application No. 15201727.3 dated May 23, 2016.
Official Communication for European Patent Application No. 15202090.5 dated May 13, 2016.
Official Communication for European Patent Application No. 16183052.6 dated Dec. 12, 2016.
Official Communication for Great Britain Patent Application No. 1404457.2 dated Aug. 14, 2014.
Official Communication for Netherlands Patent Application No. 2012433 dated Mar. 11, 2016.
Official Communication for U.S. Appl. No. 14/139,628 dated Jan. 5, 2015.
Official Communication for U.S. Appl. No. 14/139,640 dated Dec. 15, 2014.
Official Communication for U.S. Appl. No. 14/139,713 dated Dec. 15, 2014.
Official Communication for U.S. Appl. No. 14/251,485 dated Oct. 1, 2015.
Official Communication for U.S. Appl. No. 14/264,445 dated Apr. 17, 2015.
Official Communication for U.S. Appl. No. 14/278,963 dated Jan. 30, 2015.
Official Communication for U.S. Appl. No. 14/323,935 dated Jun. 22, 2015.
Official Communication for U.S. Appl. No. 14/323,935 dated Nov. 28, 2014.
Official Communication for U.S. Appl. No. 14/323,935 dated Mar. 31, 2015.
Official Communication for U.S. Appl. No. 14/473,552 dated Feb. 24, 2015.
Official Communication for U.S. Appl. No. 14/473,860 dated Nov. 4, 2014.
Official Communication for U.S. Appl. No. 14/486,991 dated Mar. 10, 2015.
Official Communication for U.S. Appl. No. 14/518,757 dated Dec. 1, 2015.
Official Communication for U.S. Appl. No. 14/518,757 dated Apr. 2, 2015.
Official Communication for U.S. Appl. No. 14/518,757 dated Jul. 20, 2015.

(56) References Cited

OTHER PUBLICATIONS

Official Communication for U.S. Appl. No. 14/579,752 dated Aug. 19, 2015.
Official Communication for U.S. Appl. No. 14/579,752 dated May 26, 2015.
Official Communication for U.S. Appl. No. 14/579,752 dated Dec. 9, 2015.
Official Communication for U.S. Appl. No. 14/581,920 dated Mar. 1, 2016.
Official Communication for U.S. Appl. No. 14/581,920 dated Jun. 13, 2016.
Official Communication for U.S. Appl. No. 14/581,920 dated May 3, 2016.
Official Communication for U.S. Appl. No. 14/639,606 dated Oct. 16, 2015.
Official Communication for U.S. Appl. No. 14/639,606 dated May 18, 2015.
Official Communication for U.S. Appl. No. 14/639,606 dated Jul. 24, 2015.
Official Communication for U.S. Appl. No. 14/639,606 dated Apr. 5, 2016.
Official Communication for U.S. Appl. No. 14/698,432 dated Jun. 3, 2016.
Official Communication for U.S. Appl. No. 14/726,353 dated Mar. 1, 2016.
Official Communication for U.S. Appl. No. 14/726,353 dated Sep. 10, 2015.
Official Communication for U.S. Appl. No. 14/857,071 dated Mar. 2, 2016.
Official Communication for U.S. Appl. No. 15/072,174 dated Jun. 1, 2016.
Restriction Requirement for U.S. Appl. No. 14/857,071 dated Dec. 11, 2015.
Office Action for European Patent Application No. 15193287.8 dated Oct. 19, 2017.
Official Communication for European Patent Application No. 14200246.8 dated Oct. 19, 2017.
Official Communication for European Patent Application No. 14200246.8 dated May 29, 2015.
Official Communication for European Patent Application No. 18202651.8 dated Nov. 16, 2018.
Official Communication for U.S. Appl. No. 15/378,567 dated Jun. 30, 2017.
Official Communication for U.S. Appl. No. 15/419,718 dated Aug. 14, 2017.
Official Communication for U.S. Appl. No. 15/419,718 dated Oct. 17, 2017.
Official Communication for U.S. Appl. No. 15/378,567 dated Feb. 14, 2018.
Official Communication for U.S. Appl. No. 15/419,718 dated Jun. 6, 2018.
Official Communication for European Patent Application No. 18200706.2 dated Feb. 18, 2019.
Official Communication for European Patent Application No. 18202157.6 dated Dec. 11, 2018.
Official Communication for U.S. Appl. No. 16/148,241 dated Feb. 7, 2019.

\* cited by examiner

FIG. 8

⚠ 8 submissions with subjects like 'Review Secured Access'
Triggered by PHISHING: TIER:0 #492421 [OPEN]

Take Action ▼  Export... ▼

○ Submissions contain a total of 61 URLs.
○ Submissions contain a total of 1 attachments.
○ This campaign was reported more than once
○ 2 URLs were found in a Domain/URL blacklist 👤 ASSIGNED TO
  Unassigned 👁 WATCHED BY
  Unwatched

| Summary | Messages (8) | Clickers (38) | ProofPoint Recipients (246) |
|---|---|---|---|
| drenk.com.br/up | | | |
| buntylic.com/about.html | | | |
| makedonyadauniversite.com/images/menu/art/index.php | | | |
| tinyurl.com/k4ha7yb | | | |
| myuif.com/omahmood | | | |
| linkedon.com/pub/ahad-choudhury/3/4b5/888 | | | |
| tinyurl.com/ozhgpzw | | | |
| smartfeet.net/ahit/mine0/2014/index.php | | | |
| tinyurl.com/peflow2q | | | |
| legacysir.com | | | |
| rotisseriebuongusto.com.br/media/securemsg/art/index.php | | | |

BLACKLISTED URLS (2)
| geekadelphia.com/business/index.php | BlackList |
| milasteknik.com.tr/index.php | RiskIQ BlackList |
| | RiskIQ BlackList |

ATTACHMENTS (1)
2C1B060229A914F2A90A8C7E3BE6EB40

SUBMITTERS (65)

FIG. 9

⚠ 8 submissions with subjects like 'Review Secured Access'
Triggered by PHISHING: TIER:0 #492421 [OPEN]

○ Submissions contain a total of 61 URLs.
○ Submissions contain a total of 1 attachments.
○ This campaign was reported more than once
○ 2 URLs were found in a Domain/URL blacklist

[Take Action ▼] [Export... ▼]

👤 ASSIGNED TO
   Unassigned

◉ WATCHED BY
   Unwatched

| Summary | Messages (8) | Clickers (38) | ProofPoint Recipients (246) |

SUBMISSION 4:
I received the below email from out client, is this phishing?

Thanks

From: Tina Strauss (mailto:tina.strauss@hmail.com)
Sent: Friday, March 27, 2015 1:13PM
Subject: Review Secured Access Hello,
    I've shared on-line with you using,
        Drop Box Online PDF View Folder
Enjoy!

Google Drive: Hace all your files within reach from any device. The Drop Team

*FIG. 10*

⚠ 8 submissions with subjects like 'Review Secured Access'
Triggered by PHISHING; TIER:0 #492421 [OPEN]

[Take Action ▾] [Export... ▾]

○ Submissions contain a total of 61 URLs.
○ Submissions contain a total of 1 attachments.
○ This campaign was reported more than once
○ 2 URLs were found in a Domain/URL blacklist ⊙ ASSIGNED TO Unassigned
⊙ WATCHED BY Unwatched

| Summary | Messages (8) | Clickers (38) | ProofPoint Recipients (246) |

| | NAME | ID | BAND |
|---|---|---|---|
| afirc.net/train/LoginVerification.php | Colquhoun, Paula F. | abt1khl | 0 |
| | Reynolds, Shawna K. | abn0tq0 | 0 |
| | NAME | ID | BAND |
| legacysir.com/maine-realtors.taf | Reynell, Micky R. | zycvwsx | 1 |
| | NAME | ID | BAND |
| nutterbearcards.com/favicon.ico | Dane, jeanna C. | zyy1z42 | 1 |
| | NAME | ID | BAND |
| legacysir.com/images/bottomtile.gif | Sutton, Vanessa D. | zy0wbxx | 1 |
| | NAME | ID | BAND |
| cres-americas.com/page/art/index_files/style.htm | Foster, Derrick S. | abizxs8 | 2 |
| | NAME | ID | BAND |
| sdocolombia.com/favicon.ico | Brooke, Rex H. | abwz4bt | 2 |

*FIG. 11*

⚠ 8 submissions with subjects like 'Review Secured Access'
Triggered by PHISHING: TIER:0 #492421 [OPEN]    [Take Action ▼] [Export...▼]

◌ Submissions contain a total of 61 URLs.
◌ Submissions contain a total of 1 attachments.
◌ This campaign was reported more than once
◌ 2 URLs were found in a Domain/URL blacklist ⊗ ASSIGNED TO
  Unassigned ◉ WATCHED BY
  Unwatched

| Summary | Messages (8) | Clickers (38) | ProofPoint Recipients (246) | | |
|---|---|---|---|---|---|
| NAME | ID | | EMAIL | | BAND |
| Colquhoun, Paula F. | abt1khl | | pfc24@example.org | | 0 |
| Reynolds, Shawna K. | abn0tq0 | | skr45@example.org | | 0 |
| Reynell, Micky R. | zycvwsx | | mrr56@example.org | | 1 |
| Dane, Jeanna C. | zyy1z42 | | jcd86@example.org | | 1 |
| Sutton, Vanessa D. | zy0wbxx | | vds71@example.org | | 1 |
| Foster, Derrick S. | ablzxs8 | | dsf42@example.org | | 2 |
| Brooke, Rex H. | abwz4bt | | rxb79@example.org | | 2 |
| Chance, Laurence D. | zyv25yz | | ldc76@example.org | | 2 |

*FIG. 12*

⚠ 8 submissions with subjects like 'Review Secured Access' Triggered by PHISHING: TIER:0 #492421 [OPEN]

[Take Action ▾] [Export... ▾]

| EMAIL | MESSAGEID | TIMESTAMP | SESSIONID | JUDGMENT | SENDER_NONFT | SUBJEC |
|---|---|---|---|---|---|---|
| 2014/11/06 09:57 | eA6Ev6dY004530 | 2014 Nov 6 14:57:06 | 1qt097u488 | notspam | linezmark@hmail.com | Re:Fwd |
| 2014/11/06 15:23 | eA6KN6do002778 | 2014 Nov 6 20:23:07 | 1qgd3km7hm | notspam | adam@camdf.com | FW: con |
| 2014/11/06 17:50 | eA6Mogra000718 | 2014 Nov 6 22:50:42 | 1qtt67ftj | notspam | nicole.dinino@bluefine.com | 6723 N. |
| 2014/11/07 18:54 | eA7NsWSk007454 | 2014 Nov 7 23:54:33 | 1qggke9cmt | notspam | linezmark@hmail.com | Re:Foot |
| 2014/11/08 09:43 | eA8Eh74A014933 | 2014 Nov 8 14:43:07 | 1qgdxmmprj | notspam | linezmark@hmail.com | Re:Foot |
| 2014/11/08 18:07 | eA8N7EUo030778 | 2014 Nov 8 23:07:14 | 1qh5rkk89v | notspam | mhuffman@huffmanco.com | Re: Alan |
| 2014/11/08 19:02 | eA902x68002034 | 2014 Nov 9 00:02:59 | 1qh5t8kb73 | notspam | linezmark@hmail.com | Re: Pote |
| 2014/11/08 19:29 | eA90TWBa006495 | 2014 Nov 9 00:29:32 | 1qhnxjhtyy | | mhuffman@huffmanco.com | |
| 2014/11/10 11:43 | eAAGh8wY017446 | 2014 Nov 10 16:43:09 | 1qjxynk0jt | notspam | davidstindner@hmail.com | Commo |
| 2014/11/10 12:00 | eAAH0JU9010153 | 2014 Nov 10 17:00:19 | 1qh5t34d3k | notspam | pmoisan@jmmcom.com | Review |
| 2014/11/10 16:21 | eAALLAEa022196 | 2014 Nov 10 21:21:11 | 1qh9d3vqp9 | notspam | jblewitt@mission.com | Review |
| 2014/11/10 16:23 | eAALNVxX030381 | 2014 Nov 10 21:23:31 | 1qjqhkga5 | notspam | jblewitt@mission.com | Review |
| 2014/11/10 16:29 | eAALTKQL005252 | 2014 Nov 10 21:29:21 | 1qh5t89b57 | notspam | jblewitt@mission.com | Review |
| 2014/11/10 16:29 | 1qca9jy3cp-1 | 2014 Nov 10 21:29:22 | 1qce9jy3cp | | jblewitt@mission.com | |
| 2014/11/11 08:20 | eABDK9CV005123 | 2014 Nov 11 13:20:09 | 1qk3wwpcrc | notspam | linezmark@hmail.com | |
| 2014/11/12 07:24 | eACCDAYo007142 | 2014 Nov 12 12:24:10 | 1qkqnurd5b | notspam | amalia915@hmail.com | Review |
| 2014/11/12 07:24 | eACC09fB022201 | 2014 Nov 12 12:24:10 | 1qk58add3x | notspam | amalia915@hmail.com | Review |
| 2014/11/12 11:19 | eACGJJqD014593 | 2014 Nov 12 16:19:20 | 1qma4whdsj | notspam | ahad.choudhury@plus.com | Point PI |
| 2014/11/12 12:09 | eACH9QTw005109 | 2014 Nov 12 17:09:27 | 1qk58akv0e | notspam | ahad.choudhury@plus.com | Re: Poin |
| 2014/11/12 14:17 | eACJHoFU001691 | 2014 Nov 12 19:17:50 | 1qksrsunpq | notspam | amalia915@hmail.com | I have b |

*FIG. 13*

⚠ 8 submissions with subjects like 'Review Secured Access'
Triggered by PHISHING: TIER:0 #492421 [OPEN]       [Take Action ▾] [Export... ▾]

◇ Submissions contain a total of 61 URLs.
◇ Submissions contain a total of 1 attachments.    ◯ ASSIGNED TO
◇ This campaign was reported more than once           Unassigned
◇ 2 URLs were found in a Domain/URL blacklist      ◉ WATCHED BY
   Unwatched

| Phishing |
| Scam |
| Spam |
| Malicious |
| In Progress |
| Legitimate |

| Reassign to... |
| Unassign |
| Watch |
| Unwatch |

| Summary | Messages (8) | Clickers (38) | ProofPoint Recipients (246) |

SENDERS (47)

mhuffman@thehuffmanco.com amalia915@hmail.com adam@camdf.com ann750@hmail.com davidlindner@hmail.com matt@lotfey.com amdlopez@hmail.com

SYSTEMS, METHODS, USER INTERFACES, AND COMPUTER-READABLE MEDIA FOR INVESTIGATING POTENTIAL MALICIOUS COMMUNICATIONS

INCORPORATION BY REFERENCE

This application is a continuation of and claims priority to U.S. patent application Ser. No. 15/253,717, filed on Aug. 31, 2016, which claims the benefit of U.S. patent application Ser. No. 15/072,174, filed Mar. 16, 2016, which claims the benefit of U.S. Provisional Patent Application No. 62/202,104, filed Aug. 6, 2015, all of which are incorporated by reference in their entireties. The disclosure below also references various features of U.S. patent application Ser. No. 14/579,752, filed Dec. 22, 2014, and U.S. Pat. No. 8,788,405 B1, issued Jul. 22, 2014. The entire disclosures of those applications are hereby made part of this specification as if set forth fully herein and incorporated by reference for all purposes, for all that they contain.

BACKGROUND

Embodiments of the present disclosure generally relate to identifying phishing, spam, and malicious electronic communications.

Phishing communications are unsolicited electronic communications, from fraudulent senders masquerading as trustworthy entities, seeking sensitive information from recipients of the unsolicited electronic communications. Spam communications are unsolicited bulk communications akin to electronic junk mail. Malicious communications include unsolicited communications sent with the intention of disrupting the recipient's computer or network communications intended to install "malware" (hostile or intrusive software, in the form of executable code, scripts, active content, and other software, which includes computer viruses, worms, Trojan horses, ransomware, spyware, adware, scareware, and other malicious programs). It is important for local network administrators to identify such communications and take appropriate actions to protect the local network or the recipients' computers or sensitive information. In this disclosure, the term "undesirable electronic communications" or "undesirable communications" encompasses, among other things, phishing, spam, and other malicious electronic communications, including those discussed above and others described herein.

SUMMARY

A recipient of a potentially undesirable electronic communication can forward the electronic communication to an administrator. A computer-implemented data analysis system can group the potentially undesirable electronic communication with any other similar potentially undesirable electronic communications in a data cluster and classify the data cluster with a classification reflecting a priority for assessing the potentially undesirable electronic communication(s) in the data cluster. The system can also generate user interface data for rendering an interactive user interface allowing an analyst to view the context and scope of the data cluster and triage all potentially undesirable electronic communication(s) in the data cluster as a group. The systems, methods, and devices described herein each have several aspects, no single one of which is solely responsible for its desirable attributes. Without limiting the scope of this disclosure, several non-limiting features will now be discussed briefly.

Embodiments of the present disclosure relate to a data analysis system that may automatically generate memory-efficient clustered data structures, automatically analyze those clustered data structures, automatically tag and group those clustered data structures in tiers, and provide results of the automated analysis and grouping in an optimized way to an analyst. The automated analysis of the clustered data structures (also referred to herein as "data clusters" or simply "clusters") may include an automated application of various criteria or rules so as to generate a tiled display of the tiers of related data clusters such that the analyst may quickly and efficiently evaluate the tiers of data clusters. In particular, the tiers of data clusters may be dynamically re-grouped and/or filtered in an interactive user interface so as to enable an analyst to quickly navigate among information associated with various tiers and efficiently evaluate the tiers of data clusters.

As described below, tiers of data clusters may include one or more potentially undesirable electronic communications, such as emails, text messages, newsgroup postings, and the like. In an example application, a human analyst may be tasked with deciding whether potentially undesirable electronic communication represents a phishing, spam, or malicious communication. In a very large local network, such as in a company employing hundreds of thousands of employees, such decisions may require a large team of analysts evaluating massive numbers of individual electronic communications. Certain embodiments include the inventive realization that grouping related potentially undesirable electronic communications in a data cluster can reduce the labor required for such decision making by allowing for triage of all potentially undesirable electronic communication(s) in the data cluster as a group.

Moreover, an individual potentially undesirable electronic communication often includes insufficient information for the analyst to effectively make such decisions. For example, the analyst could initiate an investigation with a single potentially undesirable electronic communications, such as a potentially malicious email. If the analyst examined this email by itself, then the analyst may not observe any suspicious characteristics. Certain embodiments include the inventive realization that an analyst may make better decisions based on a collection of related potentially undesirable electronic communications. For instance, two malicious emails may be related by an identical sender or similar subject fields. By viewing the emails in the context of a data cluster, the analyst could discover additional potentially undesirable electronic communications relating to the original email because of a shared characteristic. The analyst could then mark all the potentially undesirable electronic communications in the data cluster as malicious, based on the shared characteristic.

As described herein, various embodiments of the data analysis system of the present disclosure automatically create clusters of related potentially undesirable electronic communications, tags and groups the clusters in tiers, and generates an interactive user interface in which, in response to inputs from the analyst, information related to the tiers of clusters may be efficiently provided to the analyst. Accordingly, the analyst may be enabled to efficiently evaluate the tiers of clusters.

Generation of the memory-efficient clustered data structures may be accomplished by selection of one or more initial potentially undesirable electronic communication of interest (also referred to herein as "seeds"), adding of the initial potentially undesirable electronic communication to the memory-efficient clustered data structure (or, alternatively, designating the initial potentially undesirable electronic communication as the clustered data structure, or an initial iteration of the clustered data structure), and determining and adding one or more related potentially undesirable electronic communications to the cluster. The number of potentially undesirable electronic communications in the cluster may be several orders of magnitude smaller than in the entire electronic collection of data described above because only potentially undesirable electronic communication related to each other are included in the clusters.

Additionally, the automated analysis and scoring of clusters (as mentioned above) may enable highly efficient evaluation of the various data clusters by a human analyst. For example, the interactive user interface is generated so as to enable an analyst to quickly view critical groups of data clusters (as determined by automated grouping in tiers), and then in response to analyst inputs, view and interact with the generated information associated with the clusters. In response to user inputs the user interface may be updated to display data associated with each of the generated groups of clusters if the analyst desires to dive deeper into data associated with a given group of clusters.

In various embodiments, seeds may be automatically selected/generated according to various seed determination strategies, and clusters of related potentially undesirable electronic communications may be generated based on those seeds and according to cluster generation strategies (also referred to herein as "cluster strategies"). Also, as mentioned above, the system may rank or prioritize the generated clusters. High priority clusters may be of greater interest to an analyst as they may contain related potentially undesirable electronic communications that meet particular criteria related to the analyst's investigation. In an embodiment, the system may enable an analyst to advantageously start an investigation with a prioritized cluster, or group of clusters, including many related potentially undesirable electronic communications rather than a single randomly selected potentially undesirable electronic communications. Further, as described above, the cluster prioritization may enable the processing requirements of the analyst's investigation to be highly efficient as compared to processing of the huge collection of data described above. As mentioned above, this is because, for example, a given investigation by an analyst may only require storage in memory of a limited number of potentially undesirable electronic communications associated with a small number of clusters, and further, a number of potentially undesirable electronic communications in a cluster may be several orders of magnitude smaller than in the entire electronic collection of data described above because only potentially undesirable electronic communications related to each other are included in the cluster. Further, an analyst may not need to view many (or, alternatively, any) potentially undesirable electronic communications associated with a cluster to evaluate the cluster, but rather may evaluate the cluster based on the automatically generated cluster information.

In various embodiments, grouping of related data clusters enables an analyst to review the data in a logical way. For example, the data clusters may be tagged and grouped according to a recipient's position in the local network. Further, when a group of related data clusters is determined by the analyst to not be important, the analyst may quickly dismiss all potentially undesirable electronic communications of that group of clusters, rather than each potentially undesirable electronic communication separately. This advantageously enables computationally-efficient processing, allowing analysts to process entire clusters with one click rather than email by email.

According to an embodiment, a computer system is disclosed, the system comprising one, some, or all of the following features, as well as features described elsewhere in this disclosure. The system can comprise one or more computer readable storage devices configured to store one or more software modules including computer executable instructions, records of first electronic communications to internal recipients within a local network for a period of time, the records reflecting, for each of the first electronic communications, a plurality of characteristics, and/or a plurality of prescreened electronic communications, at least some of the prescreened electronic communications in the first electronic communications, each prescreened electronic communication preliminarily identified as a potential undesirable electronic communication, and each prescreened electronic communication comprising the plurality of characteristics.

The system can also comprise one or more hardware computer processors in communication with the one or more computer readable storage devices and configured to execute the one or more software modules in order to cause the computer system to: access, from the one or more computer readable storage devices, the plurality of prescreened electronic communications and the records; group, from the plurality of prescreened electronic communications, a data cluster of the prescreened electronic communications sharing a similar characteristic from the plurality of characteristics; based on a first characteristic associated with the data cluster and the same first characteristics of the records, identify recipients associated with the data cluster from the first electronic communications; based on one or more attributes of the data cluster, classify the data cluster with a classification reflecting a priority for assessing whether the prescreened electronic communications associated with the data cluster are undesirable electronic communications, such that, once initiated, the classifying is performed by the one or more hardware computer processors, without the need for manually performing the classifying; generate user interface data for rendering an interactive user interface on a computing device, the interactive user interface including an element selectable by a user, the selectable element reflecting the classification; and/or update the user interface data such that, after the selectable element is selected by the user, the interactive user interface further includes informational data regarding the data cluster, the informational data reflecting the recipients associated with the data cluster.

According to an aspect, the plurality of characteristics can comprise a from field corresponding to a purported author of the respective first electronic communication, one or more recipient fields corresponding to the recipients of the respective first electronic communication, and a subject field corresponding to a purported topic of the respective first electronic communication.

According to another aspect, the one or more attributes can comprise the number of prescreened electronic communications in the data cluster. The one or more attributes can comprise an identity of one or more recipients of the prescreened electronic communications in the data cluster. Each prescreened electronic communication can further comprise a message body, and the one or more hardware computer processors in communication with the one or more computer readable storage devices can be configured to execute the one or more software modules in order to cause the computer system to parse the message body for any uniform resource locators. The one or more attributes can comprise a determination that the message body includes at least one uniform resource locator.

According to yet another aspect, the computer system can further comprise a network connection configured to access, from one or more remote networks not within the local network, one or more domain name system blackhole lists or real-time blackhole lists, the one or more attributes comprising a determination that the message body includes at least one uniform resource locator, or a portion thereof, on the domain name system blackhole list(s) or real-time blackhole list(s). The one or more computer readable storage devices can be further configured to store a log of requests from the local network seeking resources outside the local network, and the one or more hardware computer processors in communication with the one or more computer readable storage devices can be configured to execute the one or more software modules in order to cause the computer system to identify instances in the log indicating a request from the local network seeking a parsed uniform resource locator. The informational data can further reflect an identification of the instances in the log.

According to another aspect, the one or more hardware computer processors in communication with the one or more computer readable storage devices can be configured to execute the one or more software modules in order to further cause the computer system to receive a disposition from the user that the prescreened electronic communications associated with the data cluster are undesirable electronic communications. The one or more hardware computer processors in communication with the one or more computer readable storage devices can be configured to execute the one or more software modules in order to further cause the computer system to, based on the disposition, transmit an electronic notification to the recipients associated with the data cluster.

According to an embodiment, a computer-implemented method is disclosed, the method comprising one, some, or all of the following features, as well as features described elsewhere in this disclosure. The method can comprise, as implemented by one or more computer readable storage devices configured to store one or more software modules including computer executable instructions, and by one or more hardware computer processors in communication with the one or more computer readable storage devices configured to execute the one or more software modules, accessing, from the one or more computer readable storage devices, a plurality of electronic communications, each comprising a message body, a from field corresponding to a purported author of the respective prescreened electronic communication, and a subject field corresponding to a purported topic of the respective prescreened electronic communication, grouping, from the plurality of electronic communications, a data cluster of the electronic communications sharing a similar from field or a similar subject field, and/or accessing, from one or more remote networks, one or more domain name system blackhole lists or real-time blackhole lists.

The method can further comprise, for one or more of the electronic communications in the data cluster, parsing the respective message body for uniform resource locators, based at least in part on a determination that the message body includes at least one uniform resource locator, or a portion thereof, on the domain name system blackhole list(s) or real-time blackhole list(s), classifying the data cluster with a classification reflecting a priority for assessing whether the electronic communications associated with the data cluster are undesirable electronic communications, such that, once initiated, the classifying is performed by the one or more hardware computer processors, without the need for manually performing the classifying, generating user interface data for rendering an interactive user interface on a computing device, the interactive user interface including an element selectable by a user, the selectable element reflecting the classification, and/or updating the user interface data such that, after the selectable element is selected by the user, the interactive user interface further includes informational data regarding the data cluster.

According to an aspect, each electronic communication can further comprise the one or more recipient fields. The computer-implemented method can further comprise accessing records of first electronic communications to internal recipients within a local network for a period of time, the records reflecting, for each of the first electronic communications, a from field corresponding to a purported author of the respective first electronic communication, one or more recipient fields corresponding to the recipients of the respective first electronic communication, and a subject field corresponding to a purported topic of the respective first electronic communication.

According to another aspect, the computer-implemented method can further comprise, based on the from field or the subject field associated with the data cluster and the from fields or the subject fields of the records, identifying additional recipients associated with the data cluster from the first electronic communications. The classifying can be further based, at least in part, on an identity of one or more the recipients of the electronic communications in the data cluster.

According to yet another aspect, the method can further comprise accessing a log of requests from the local network seeking resources outside the local network; and identifying instances in the log indicating a request from the local network seeking a parsed uniform resource locator. The informational data can comprise an identification of the instances in the log.

According to another aspect, the method can further comprise receiving a disposition from the user that the electronic communications associated with the data cluster are undesirable electronic communications. The method can further comprise, based on the disposition, transmitting an electronic notification to recipients associated with the data cluster and the additional recipients.

In various embodiments, computer-implemented methods are disclosed in which, under control of one or more hardware computing devices configured with specific computer executable instructions, one or more aspects of the above-described embodiments are implemented and/or performed.

In various embodiments, a non-transitory computer-readable storage medium storing software instructions is disclosed that, in response to execution by a computer system having one or more hardware processors, configure the computer system to perform operations comprising one or more aspects of the above-described embodiments.

Further, as described herein, a data analysis system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The various embodiments of interactive and dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for an analyst user.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components (for example, retrieval of clusters), automatic and dynamic execution of complex processes in response to the input delivery (for example, grouping and filtering of clusters), automatic interaction among various components and processes of the system, and/or automatic and dynamic updating of the user interfaces. The interactions and presentation of data via the interactive user interfaces described herein may accordingly provide cognitive and ergonomic efficiencies and advantages over previous systems.

Advantageously, according to various embodiments, the disclosed techniques provide a more effective starting point and user interface for an investigation of potentially undesirable electronic communications of various types. An analyst may be able to start an investigation from a group of clusters of related potentially undesirable electronic communications instead of an individual potentially undesirable electronic communication, which may reduce the amount of time and effort required to perform the investigation. The disclosed techniques may also, according to various embodiments, provide a prioritization of multiple clusters, and dynamic re-grouping of related clusters and cluster filtering. For example, the analyst may also be able to start the investigation from a high priority group of clusters, which may allow the analyst to focus on the most important investigations, and may quickly evaluate that group of clusters based on the efficient user interface generated by the system. In each case, the processing and computational requirements of such an investigation may be significantly reduced due to the creation and use of highly efficient cluster data structures of related potentially undesirable electronic communications.

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

FIG. 8 is a data cluster analysis user interface showing potentially undesirable electronic communications for a high priority group of data clusters, as used in an embodiment.

FIGS. 9-13 are dossier analysis user interfaces showing informational data regarding a data cluster, as used in an embodiment.

FIGS. 14A and 14B are dossier analysis user interfaces showing informational data regarding a data cluster, as used in an embodiment.

Figure 1:
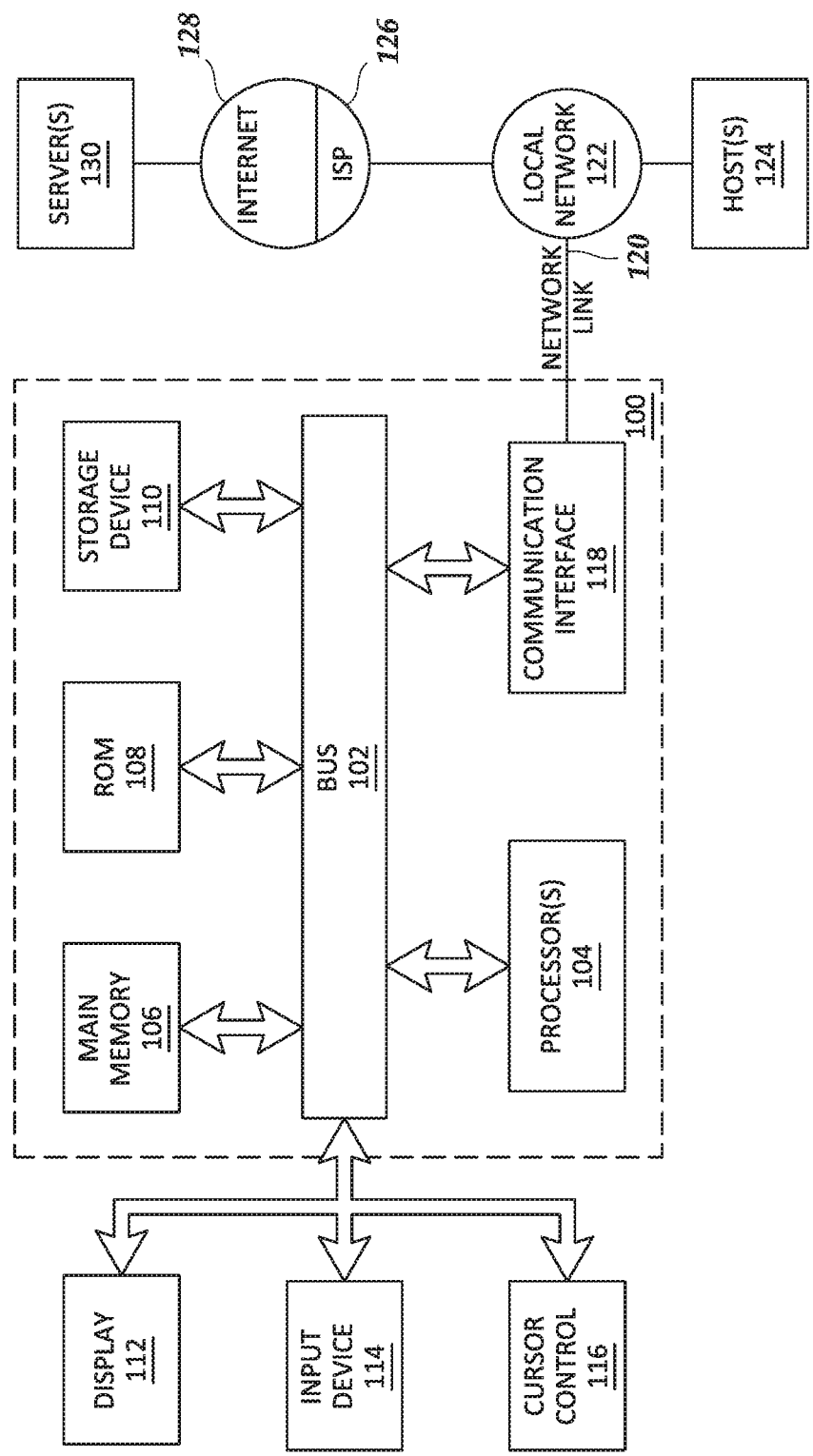
FIG. 1 is a block diagram of a server system, as used in an embodiment.

In the drawings, the first one or two digits of each reference number typically indicate the figure in which the element first appears. Throughout the drawings, reference numbers may be reused to indicate correspondence between referenced elements. Nevertheless, use of different numbers does not necessarily indicate a lack of correspondence between elements. And, conversely, reuse of a number does not necessarily indicate that the elements are the same.

DETAILED DESCRIPTION

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Terms

In order to facilitate an understanding of the systems and methods discussed herein, a number of terms are defined below. The terms defined below, as well as other terms used herein, should be construed broadly to include, without limitation, the provided definitions, the ordinary and customary meanings of the terms, and/or any other implied meanings for the respective terms. Thus, the definitions below do not limit the meaning of these terms, but only provide example definitions.

Database: A broad term for any data structure for storing and/or organizing data, including, but not limited to, relational databases (for example, Oracle database, mySQL database, and the like), spreadsheets, XML files, and text files, among others. The various terms "database," "data store," and "data source" may be used interchangeably in the present disclosure.

Potentially undesirable electronic communication: An electronic communication that has been preliminarily screened and identified as a possible undesirable electronic communication but that has not been triaged by a designated analyst and conclusively identified as an undesirable electronic communication. A potentially undesirable electronic communication may represent a document or other unstructured data source such as an e-mail message, a news report, or a written paper or article. Each potentially undesirable electronic communication may be associated with a unique identifier that uniquely identifies it. The preliminary screening can be done by a human recipient. The preliminary screening can be done automatically, without human intervention, by electronic rules or a program.

Cluster: A group or set of one or more related potentially undesirable electronic communications. A cluster may be generated, determined, and/or selected from one or more sets of potentially undesirable electronic communication according to a cluster generation strategy. A cluster may further be generated, determined, and/or selected based on a seed. For example, a seed may comprise an initial potentially undesirable electronic communication of a cluster. Potentially undesirable electronic communications related to the seed may be determined and added to the cluster. Further, additional potentially undesirable electronic communications related to any clustered potentially undesirable electronic communication may also be added to the cluster iteratively as indicated by a cluster generation strategy. Potentially undesirable electronic communications may be related by any common and/or similar properties, metadata, types, relationships, and/or the like. Clusters may also be referred to herein as "data clusters."

Seed: One or more potentially undesirable electronic communications that may be used as a basis, or starting point, for generating a cluster. A seed may be generated, determined, and/or selected from one or more sets of potentially undesirable electronic communications according to a seed generation strategy. For example, seeds may be generated from potentially undesirable electronic communications accessed from various databases and data sources.

Dossier: A collection of information associated with a cluster or a group of clusters and/or a user interface for displaying such a collection.

Overview

When investigating phishing, spam, or malicious communications, an analyst may have to make decisions regarding a large number of electronic communications that may or may not be related to one another, and which may be stored in an electronic data store or memory. For example, such a collection of data may include hundreds of thousands or millions of potentially undesirable electronic communications, and may consume significant storage and/or memory. Determination and selection of relevant communications within such a collection may be extremely difficult for the analyst. Further, processing of such a large collection of data (for example, as an analyst uses a computer to sift and/or search through large pluralities of potentially undesirable electronic communications) may be extremely inefficient and consume significant processing and/or memory resources.

This disclosure relates to a system for analyzing potentially undesirable electronic communications (also referred to herein as the "system") in which computationally-efficient clustered data structures (also referred to herein as "clusters") of related electronic communications may be automatically generated and analyzed, tagged, grouped, and results may be provided for interaction from an analyst, for example. Generation of clusters may begin by automatic generation, determination, and/or selection of one or more initial communications of interest, called "seeds." Clusters of related electronic communications may be generated based on those seeds and according to cluster generation strategies (also referred to herein as "cluster strategies," "clustering strategies," and/or "cluster generation rules"). Seeds and related electronic communications may be accessed from various databases and data sources including, for example, databases maintained by financial institutions, government entities, private entities, public entities, and/or publicly available data sources. Such databases and data sources may include a variety of information and data, such as, for example, computer network-related data, and/or computer-related activity data, among others. Further, the databases and data sources may include various relationships that link and/or associate electronic communications with one another. Various electronic communications and relationships may be stored across different systems controlled by different items and/or institutions. According to various embodiments, the system may bring together data from multiple data sources in order to build clusters.

In the following description, numerous specific details are set forth to provide a more thorough understanding of various embodiments of the present disclosure. It will be apparent to one of skill in the art, however, that the systems and methods of the present disclosure may be practiced without one or more of these specific details.

DESCRIPTION OF THE FIGURES

Embodiments of the disclosure will now be described with reference to the accompanying Figures. The terminology used in the description is not intended to be interpreted in any limited or restrictive manner, simply because it is being utilized in conjunction with a detailed description of certain specific embodiments of the disclosure. Furthermore, embodiments of the disclosure described above and/or below may include several novel features, no single one of which is solely responsible for its desirable attributes or which is essential to practicing the embodiments of the disclosure herein described.

I. Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

FIG. 1 is a block diagram that illustrates a computer system 100 upon which an embodiment may be implemented. For example, any of the computing devices discussed herein may include some or all of the components and/or functionality of the computer system 100.

Computer system 100 includes a bus 102 or other communication mechanism for communicating information, and a hardware processor, or multiple processors, 104 coupled with bus 102 for processing information. Hardware processor(s) 104 may be, for example, one or more general purpose microprocessors.

Computer system 100 also includes a main memory 106, such as a random access memory (RAM), cache and/or other dynamic storage devices, coupled to bus 102 for storing information and instructions to be executed by processor 104. Main memory 106 also may be used for storing temporary variables or other intermediate information during execution of instructions to be executed by processor 104. Such instructions, when stored in storage media accessible to processor 104, render computer system 100 into a special-purpose machine that is customized to perform the operations specified in the instructions.

Computer system 100 further includes a read only memory (ROM) 108 or other static storage device coupled to bus 102 for storing static information and instructions for processor 104. A storage device 110, such as a magnetic disk, optical disk, or USB thumb drive (Flash drive), etc., is provided and coupled to bus 102 for storing information and instructions.

Computer system 100 may be coupled via bus 102 to a display 112, such as a cathode ray tube (CRT) or LCD display (or touch screen), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 100 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage Computer system 100 may implement the techniques described herein using customized hard-wired logic, one or more ASICs or FPGAs, firmware and/or program logic which in combination with the computer system causes or programs computer system 100 to be a special-purpose machine. According to one embodiment, the techniques herein are performed by computer system 100 in response to processor(s) 104 executing one or more sequences of one or more instructions contained in main memory 106. Such instructions may be read into main memory 106 from another storage medium, such as storage device 110. Execution of the sequences of instructions contained in main memory 106 causes processor(s) 104 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 110. Volatile media includes dynamic memory, such as main memory 106. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 102. Transmission media can also take the form of acoustic or light waves, such as those generated during radio-wave and infra-red data communications.

Various forms of media may be involved in carrying one or more sequences of one or more instructions to processor 104 for execution. For example, the instructions may initially be carried on a magnetic disk or solid state drive of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 may retrieve and execute the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card, cable modem, satellite modem, or a modem to provide a data communication connection to a corresponding type of telephone line. As another example, communication interface 118 may be a local area network (LAN) card to provide a data communication connection to a compatible LAN (or WAN component to communicate with a WAN). Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are example forms of transmission media.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118.

The received code may be executed by processor 104 as it is received, and/or stored in storage device 110, or other non-volatile storage for later execution.

Figure 2:
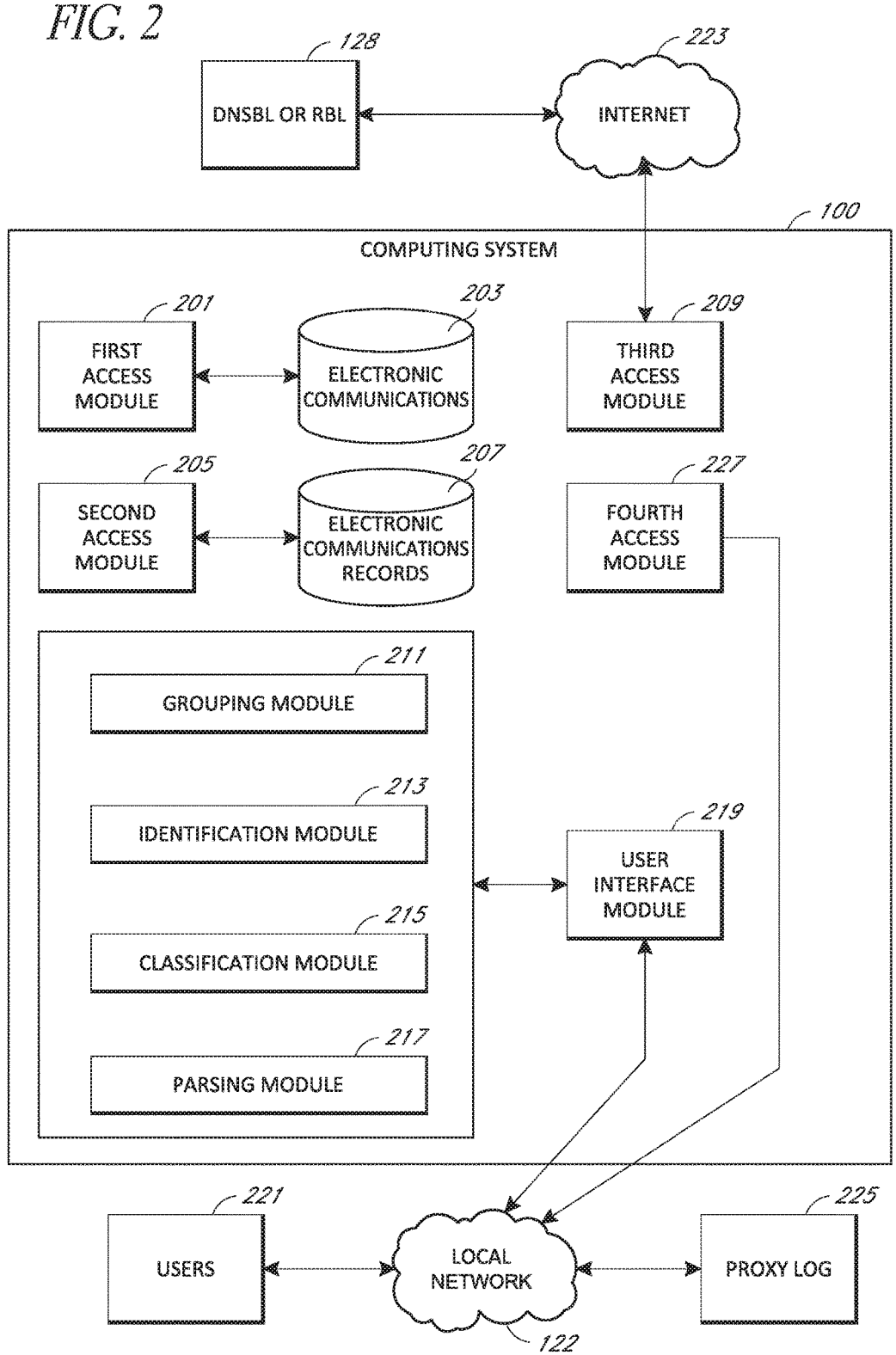
FIG. 2 is a block diagram of a computing system for analyzing potentially undesirable electronic communications, as used in an embodiment.

FIG. 2 is a block diagram of the computer system 100 for analyzing potentially undesirable electronic communications, as used in an embodiment. In variations, additional blocks may be included, some blocks may be removed, and/or blocks may be connected or arranged differently from what is shown.

Computer system 100 interfaces with local network 122, described above with reference to FIG. 1. Users 221 interact with the local network 122, for example, for email, text messaging, newsgroups, etc. In certain embodiments, users 221 can receive electronic communications via the local network 122. A recipient (one of the users 221) of an electronic communication can make a preliminary determination that the communication is a potential phishing, spam, or malicious communication and forward the communication to an administrator. For example, a company employee can forward a potential phishing, spam, or malicious email to a corporate "abuse" email account (e.g., abuse@example.org).

Computer system 100 may include computer readable storage devices. For example, computer system 100 may include electronic communications records storage device 207. The electronic communications records storage device 207 may be configured to store records of first electronic communications to internal recipients within a local network for a period of time. As an example, the electronic communications records storage device 207 can store records of emails sent to recipients within the local network 122 over the last week or the last month or the last six months. An example can be a PROOFPOINT (Proofpoint, Inc., Sunnyvale, Calif.) log. For each of the first electronic communications, a record can reflect the "from" field corresponding to a purported author of the first electronic communication, one or more "recipient" fields corresponding to the recipients of the respective first electronic communication (e.g., a "to" field, a "cc" field, and/or a "bcc" field), and/or the subject field corresponding to a purported topic of the respected first electronic communication. An electronic communications record need not be an email itself. This term is a broad term and encompasses subsets of data about electronic communications. For example, the term encompasses certain metadata regarding emails.

Computer system 100 may further include electronic communications storage device 203. The electronic communications storage device 203 may be configured to store a plurality of prescreened electronic communications. As an example, the electronic communications storage device 203 can store prescreened emails. In at least one embodiment, each prescreened electronic communication is preliminarily identified as a potential undesirable electronic communication.

As used herein, the term prescreened electronic communication refers to an electronic communication that has been reviewed and identified as potentially having a certain characteristic or characteristics. The review need not be detailed or performed by someone with special training. For example, the initial recipient of the electronic communication can perform the prescreening. In this regard, a prescreened electronic communication can refer to an email that has been reviewed by its human recipient and judged or identified as a potentially undesirable electronic communication. In other instances, as noted above, the prescreening can occur without human intervention, for example, with applied rules or a suitable program. A company employee can forward a potential phishing, spam, or malicious email to an abuse account. Fourth access module 227 and/or another suitable module interfacing with the local network 122 can execute a suitable script to download the emails in the abuse email account to a computer folder or subfolder or other database as text-formatted file, such as an .eml file. The computer folder, subfolder, or other database can represent an example of electronic communications storage device 203, discussed above. Each prescreened electronic communication in the electronic communications storage device 203 can include a from field, one or more recipient fields, a subject field, and/or a message body.

Computer system 100 may include one or more modules which may be implemented as software or hardware. For example, computer system 100 may include first access module 201. The first access module 201 may be configured to access, from the electronic communications storage device 203, the plurality of prescreened electronic communications. Computer system 100 may include second access module 205. The second access module 205 may be configured to access, from the electronic communications records storage device 207, the records.

Computer system 100 may include grouping module 211. Grouping module 211 of computer system 100 may be configured to group, from the plurality of prescreened electronic communication, a data cluster of the prescreened electronic communications. A data cluster may be generated, determined, and/or selected from one or more sets of electronic communications according to a cluster generation strategy. A data cluster may further be generated, determined, and/or selected based on a seed. For example, seeds may comprise emails received within a time or date range, such as the last 24 hours. Electronic communications related to the seeds may be determined and added to the cluster. Further, additional electronic communications related to any clustered electronic communication may also be added to the cluster iteratively as indicated by a cluster generation strategy. Electronic communications may be related by any common and/or similar properties, metadata, types, relationships, and/or the like. Data clusters may also be referred to herein as "clustered data structures," "electronic communication clusters," and "clusters." Data clusters are described in further detail in U.S. patent application Ser. No. 14/579,752 and U.S. Pat. No. 8,788,405, which have been incorporated herein by reference in their entireties.

In at least one embodiment, the prescreened electronic communications of a data cluster share a similar from field and/or a similar subject field. For example, the grouping module 211 can identify an initial electronic communication and its from field and/or its subject field. The grouping module 211 may identify additional electronic communications with similar from fields and/or similar subject fields and add them to the cluster. In at least one embodiment, the grouping module 211 identifies electronic communications having the same from field. Alternatively, or in conjunction, the grouping module 211 can identify electronic communications having from fields with similar characteristics. For instance, the grouping module 211 can implement regular expression matching or another suitable pattern recognition algorithm to identify email addresses having the same local part (the part before the "@" symbol), even if the email addresses have different domain parts (the part after the "@" symbol). Or the grouping module 211 can identify email addresses having similar patterns, such as abc1def@example.com, bcd2efg@example.com, and cde3fgh@example.com. As yet another example, grouping module 211 can identify electronic communications having the same subject field. Alternatively, or in conjunction the grouping module 211 can identify electronic communications having subject fields with similar characteristics. For instance the grouping module 211 can identify email subjects following a pattern, such as "<Varying Bank Name>: Online Banking Security Precaution," using a suitable technique such as regular expression matching.

Other suitable techniques for identifying additional electronic communications with similar from fields and/or similar subject fields and adding them to the cluster with the grouping module 211 are also contemplated. Yet another example of such grouping can include grouping based on similar edit distances. Edit distance is a technique of quantifying how dissimilar two strings (such as words) are to one another by counting the minimum number of operations required to transform one string into the other.

Optionally, computer system 100 may further include an identification module 213. The identification module 213 of computer system 100 may identify additional recipients associated with the data cluster. As noted above, a data cluster comprises prescreened electronic communications. The additional recipients need not be associated with prescreened electronic communications. For example, many recipients within a local network may receive similar emails and some of those recipients may report the emails as potential phishing communications to an administrator. Some recipients may not report the emails to anyone, however.

In this regard, the additional recipients can be identified in the records accessed by second access module 205 or in another electronic communications storage device (not shown). For example, identification module 213 can identify the subject field of the prescreened electronic communications or a substring within the subject field of the prescreened electronic communications, such as the first, middle, or last n characters. Then, the identification module 213 can access electronic communications records storage device 207 (optionally via second access module 205) and identify additional electronic communications having the same subject field or substring. Based on the subject fields of the identified additional electronic communications, the identification module 213 can determine additional recipients of those additional electronic communications corresponding with the associated to, cc, or bcc fields.

Computer system 100 may include an optional classification module 215. Classification module 215 of computer system 100 may be configured to classify, based on one or more attributes of the data cluster, the data cluster with a classification reflecting a priority for assessing whether the prescreened electronic communications associated with the data cluster are undesirable electronic communications. Advantageously, the classification module 215 is configured such that, once initiated, the classifying is performed by the one or more hardware computer processors, without the need for manually performing the classifying.

For instance, in one embodiment, classification module 215 can automatically determine a rank or status of a recipient of a prescreened electronic communication in a data cluster without requiring user intervention. As an example, classification module can identify an employee identification number associated with a recipient, cross reference the employee identification number against an organizational database for the local network, and determine the recipient's rank. The relevant information, such as the employee identification number and rank, can be stored to the data cluster dossier. A data cluster including a recipient with a sufficiently high rank or status, such as a C suite officer or critical employee, may be assigned classification reflecting a high priority for assessing whether the prescreened electronic communications associated with the data cluster are undesirable electronic communications.

Computer system 100 may also include a parsing module 217. As discussed above, each prescreened electronic communication can comprise a message body in some embodiments. Parsing module 217 of computer system 217 may be configured to parse, for one or more of the electronic communications in the data cluster, the respective message body for certain strings, such as uniform resource locators.

Computer system 100 may include a user interface module 219. The user interface module 219 can be configured to generate user interface data for rendering an interactive user interface on a computing device. The user interface module 219 can also be configured to update the user interface data. User interface module 219 may include one or more modules configured to generate user interfaces, such as web pages, desktop applications, mobile interfaces, voice interfaces, and the like. The user interface module 219 may invoke the above described modules in order to make calculations to be presented to individuals. The user interface module 219 may present data via network. The user interface module 219 may further receive input from individuals so that the input may be provided to the appropriate modules and/or stored.

Computer system can optionally interact with a proxy log 225 via the local network 122. In general, the proxy log 225 is produced by a local network proxy server and gives detailed information about the URLs accessed by specific users 221. In various embodiment discussed herein, fourth access module 227 and/or another suitable module interfacing with the local network 122 can execute a suitable script to search the proxy log for a particular URL or IP address and determine which users 221 (if any) have accessed the URL.

Computer system 100 is also configured to interface with DNSBL or RBL 128 or other blacklist. DNSBL stands for a DNS-based Blackhole List, and RBL stands for Real-time Blackhole List. These are "blacklists" of locations on the Internet reputed to send email spam or other undesirable electronic communications. In computing, a blacklist is a basic access control mechanism for allowing through elements, except those explicitly mentioned in the list. Those items on the list are denied access. Third access module 209 can be used to interface with third party vendor's DNSBL or RBL 128 or other blacklist via Internet 223. For example, as described in greater detail below, third access module 209 can be instructed to check an IP address against DNSBL or RBL 128 or other blacklist, such as dnsbl.example.net. The third access module 209 can take the IP access (such as 192.168.42.23) and reverse the order of the octets (23.42.168.192). The third access module 209 can then append the domain name of DNSBL or RBL 128 or other blacklist, yielding 23.42.168.192.dnsbl.example.net. Subsequently, the third access module 209 can look up this name in the DNS as a domain name. The query will either return an address, indicating that the IP address is blacklisted or a no-such-domain code (such as NXDOMAIN), indicating that the IP address is not blacklisted. If the IP address is listed, the third access module 209 optionally can look up why the IP address is listed as a text record, a function supported by most blacklist services.

II. Implementation Methods

Figure 3:
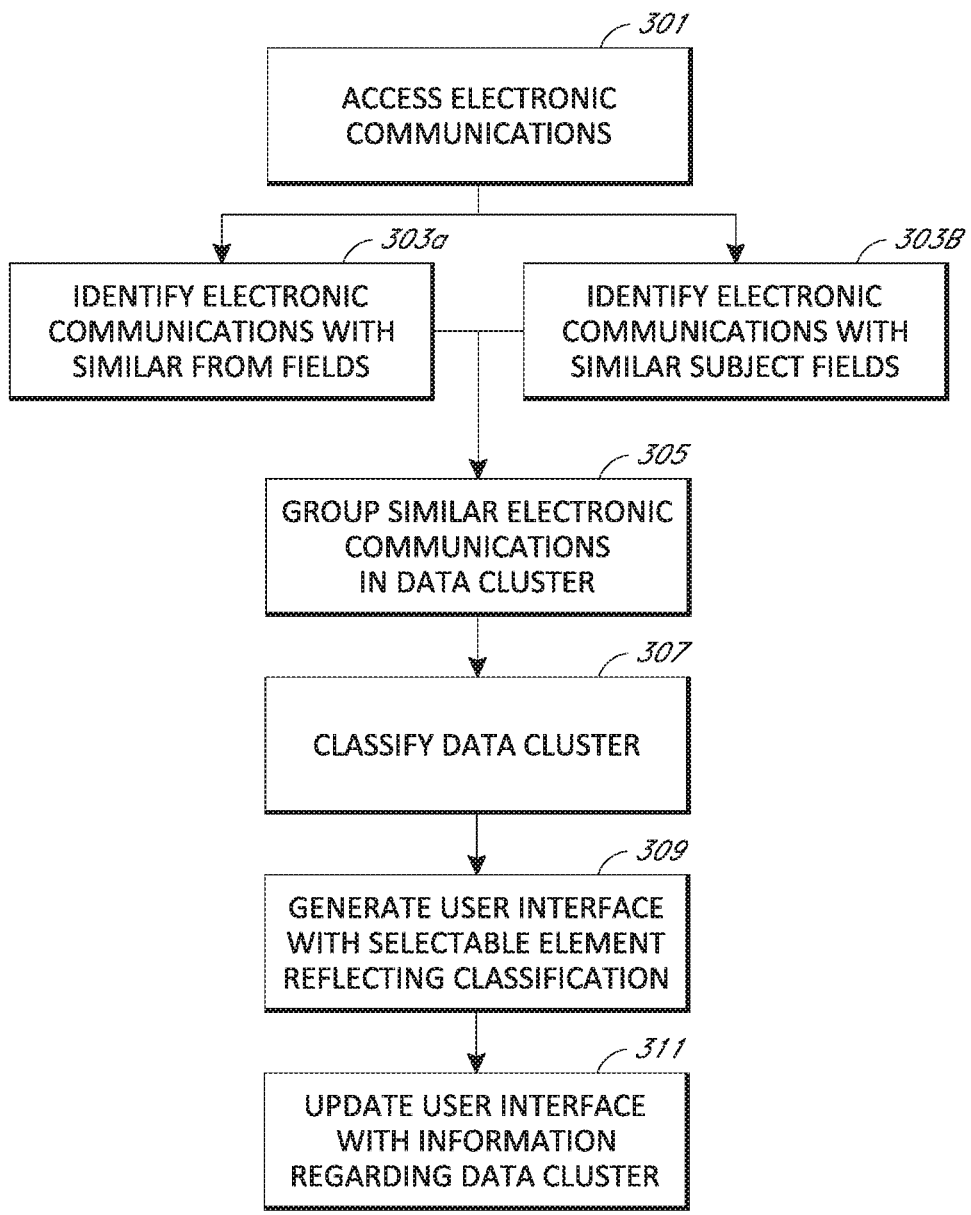
FIG. 3 is a process of analyzing potentially undesirable electronic communications, as used in an embodiment.

FIG. 3 shows an example method for implementing computer system 100 of FIG. 2, namely, a process of analyzing potentially undesirable electronic communications. In box 301, computer system 100 accesses electronic communications. Box 301 of FIG. 3 can be implemented with first access module 201 and second access module 205 of FIG. 2. In an example embodiment, a script is executed to generate the initial seeds for generating collections of clusters of related data from the seeds, as described in U.S. Pat. No. 8,788,405, incorporated herein by reference. The seeds can be, for instance, a time or date range of emails to target. The script can update the seeds each run to have the time or date range be, for example, the last 24-hour window.

In box 303a, computer system 100 identifies electronic communications with similar from fields. In box 303b, computer system 100 identifies electronic communications with similar subject fields. As discussed with reference to FIG. 2, box 303a in box 303b can be implemented with identification module 213. It should be clear that computer system 100 does not necessarily have to implement both box 303a and box 303b in the method. They can be implemented in the alternative. In box 305, computer system 100 groups similar electronic communications in a data cluster. Box 305 can be implemented with grouping module 211. For example, a cluster strategy, as described in U.S. Pat. No. 8,788,405, can be executed. The cluster strategy can process new emails, that is, emails received within the last 24 hours. The cluster strategy loads any data cluster object that has been modified in the last day. In other embodiments, the cluster strategy can load any data cluster object previously marked as malicious, which may encompass emails received greater than 24 hours in the past. For each new email, the strategy checks whether that email is already part of a data cluster. The strategy can merge the email with an existing data cluster based on subject. Emails that are not part of a data cluster generate new data clusters that eventually can be linked to other emails with similar subjects, senders, etc. Linking emails can be based off an identification property number for the data cluster. A data cluster can include information such as the submitter(s), recipients, external senders, subjects, and any URLs for the associated potentially undesirable electronic communications, as well as the body of the relevant email(s). A dossier can be created for each data cluster. The dossier comprises additional information besides the information from the potentially undesirable electronic communications that is relevant during analyst triage.

In box 307, computer system 100 classifies the data cluster. Box 307 can be implemented with classification module 215. An example classification is a priority tier, reflecting a priority for assessing whether the potentially undesirable electronic communications associated with the data cluster are actually undesirable electronic communications. The classification can be performed without the need for manual user intervention.

A factor in the classification algorithm can include the number of potentially undesirable electronic communications that are in the data cluster. Certain embodiments include the inventive realization that multiple similar potentially undesirable electronic communications submitted to an abuse account are more likely to be undesirable electronic communications than single instance electronic communications submitted to the abuse account.

Another factor in the classification algorithm can include whether the data cluster comprises any URLs on a DNSBL and/or RBL or other blacklist. Certain embodiments include the inventive realization that a data cluster including a URL on a DNSBL and/or RBL or other blacklist is more likely to be associated with undesirable electronic communications than a data cluster that does not include URLs or any identified URLs are not on a DNSBL and/or RBL or other blacklist.

Another factor in the classification algorithm can include whether the data cluster is associated a recipient with a sufficiently high rank or status, such as a C suite officer or critical employee. For example, it is important to identify phishing attacks targeting high ranking individuals in a local network, as compromised information can affect the local network's integrity. The identified tiers can be classified as desired. For example, tier 0 may be defined to relate to the highest priority data clusters (those most likely to be phishing or malicious communication) while tier 3 relates to the lowest priority data clusters (those most likely to be spam communications).

In box 309, computer system 100 generates a user interface with at least one selectable element reflecting the classification. And in box 311, computer system 100 updates the user interface with information regarding the data cluster. Box 309 and box 311 can be implemented with user interface module 219. For example, an analyst can review a dossier associated with a data cluster in a tier 0 classification and determine if the associated data cluster is malicious, phishing, spam, or a legitimate communication. The analyst assigns the dossier a status. The status is transferred to the data cluster. The analyst can mark entire clusters as legitimate or not.

Figure 4:
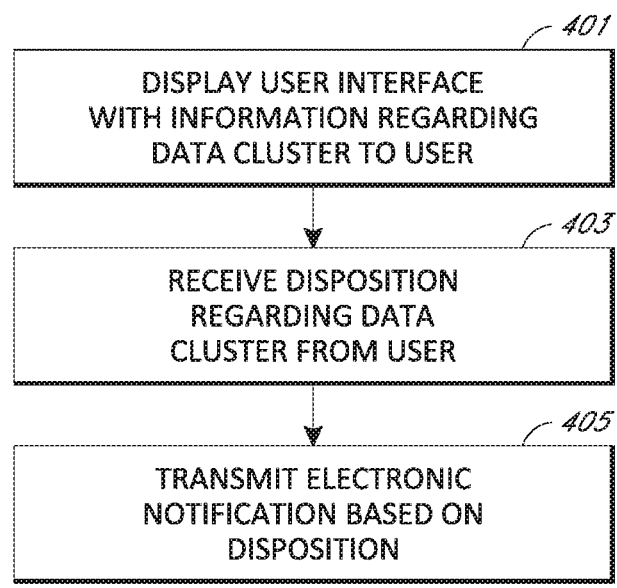
FIG. 4 is process of taking action based on potentially undesirable electronic communications, as used in an embodiment.

FIG. 4 shows another example method for implementing computer system 100 of FIG. 2, namely, a process of taking action based on potentially undesirable electronic communications. In box 401, computer system 100 displays a user interface with information regarding data cluster to user. In box 403, computer system 100 receives a disposition regarding the data cluster from a user. In box 405 computer system 100 transmits electronic notification based on the disposition. For example, a network administrator can execute a script to identify data clusters that were recently updated with a status. The script can identify all recipients associated in the dossier (including recipients who did not report the electronic communication to an abuse account) and send the recipients an email indicating the received electronic communication was a phishing, malicious, or other high-risk communication. In certain embodiments, when a new recipient reports an electronic communication as potentially undesirable and the cluster strategy merges the electronic communication with an existing data cluster already assigned a status, the script will send the new recipient a notification.

Figure 5:
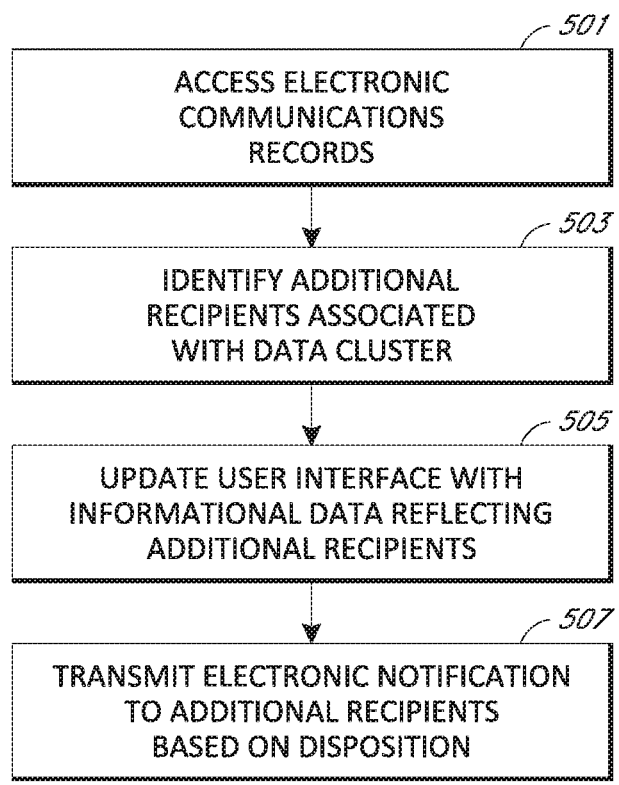
FIG. 5 is a process of analyzing potentially undesirable electronic communications and taking action based thereon, as used in an embodiment.

FIG. 5 shows another example method for implementing computer system 100 of FIG. 2, namely, a process of analyzing potentially undesirable electronic communications and taking action based thereon. In box 501, the computer system 100 accesses electronic communication records. In box 503, computer system 100 identifies additional recipients associated with the data cluster. For example, PROOFPOINT logs can be searched for emails with similar subjects. This search identifies additional recipients that received potentially undesirable electronic communications but did not report them to the abuse account discussed above. The additional recipients and/or relevant PROOFPOINT log entries can be added to the data cluster dossier. In box 505, computer system 100 updates the user interface with informational data reflecting the additional recipients. In box 507, computer system 100 transmits an electronic notification to additional recipients based on the disposition.

Figure 6:
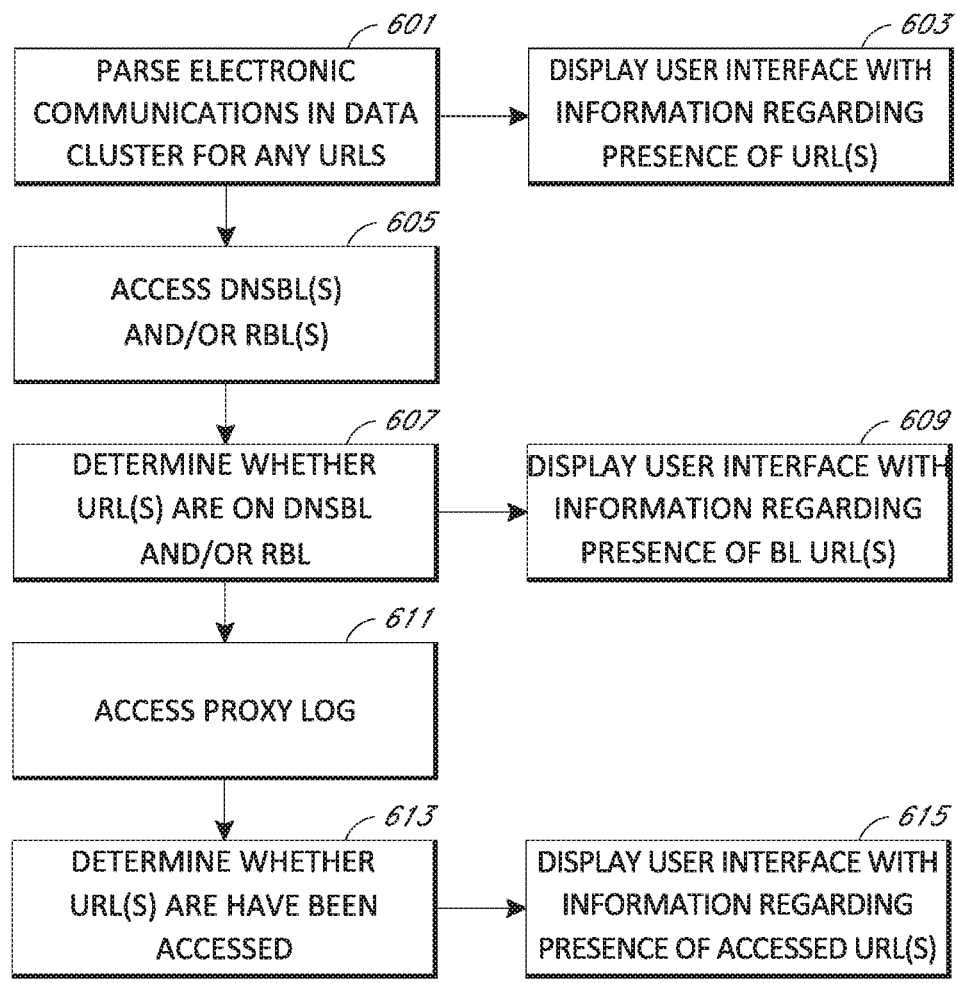
FIG. 6 is a process of analyzing potentially undesirable electronic communications, as used in an embodiment.

FIG. 6 shows yet another example method for implementing computer system 100 of FIG. 2, namely, a process of analyzing potentially undesirable electronic communications. In box 601, computer system 100 parses electronic communications in the data cluster for any URLs. In box 603, computer system 100 displays a user interface with information regarding the presence of any URLs. In box 611, computer system 100 accesses the proxy log. In box 613, computer system 100 determines whether the parsed URLs have been accessed by any users of the local network. In box 615 computer system 100 displays on the user interface information regarding the presence of any accessed URLs. For example, the local network proxy log can be searched for traffic to any URLs identified in the emails in the data cluster. This search identifies any members of the local network who visited a potentially malicious website by clicking on a URL in an email. These "clickers" can be added to the data cluster dossier.

In box 605, computer system 100 accesses one or more DNSBLs and/or RBLs or other blacklists. In box 607, computer system 100 determines whether the parsed URLs are on a DNSBL and/or RBL or other blacklist. In box 609, computer system 100 displays on the user interface information regarding the presence of blacklist URLs.

Figure 7:
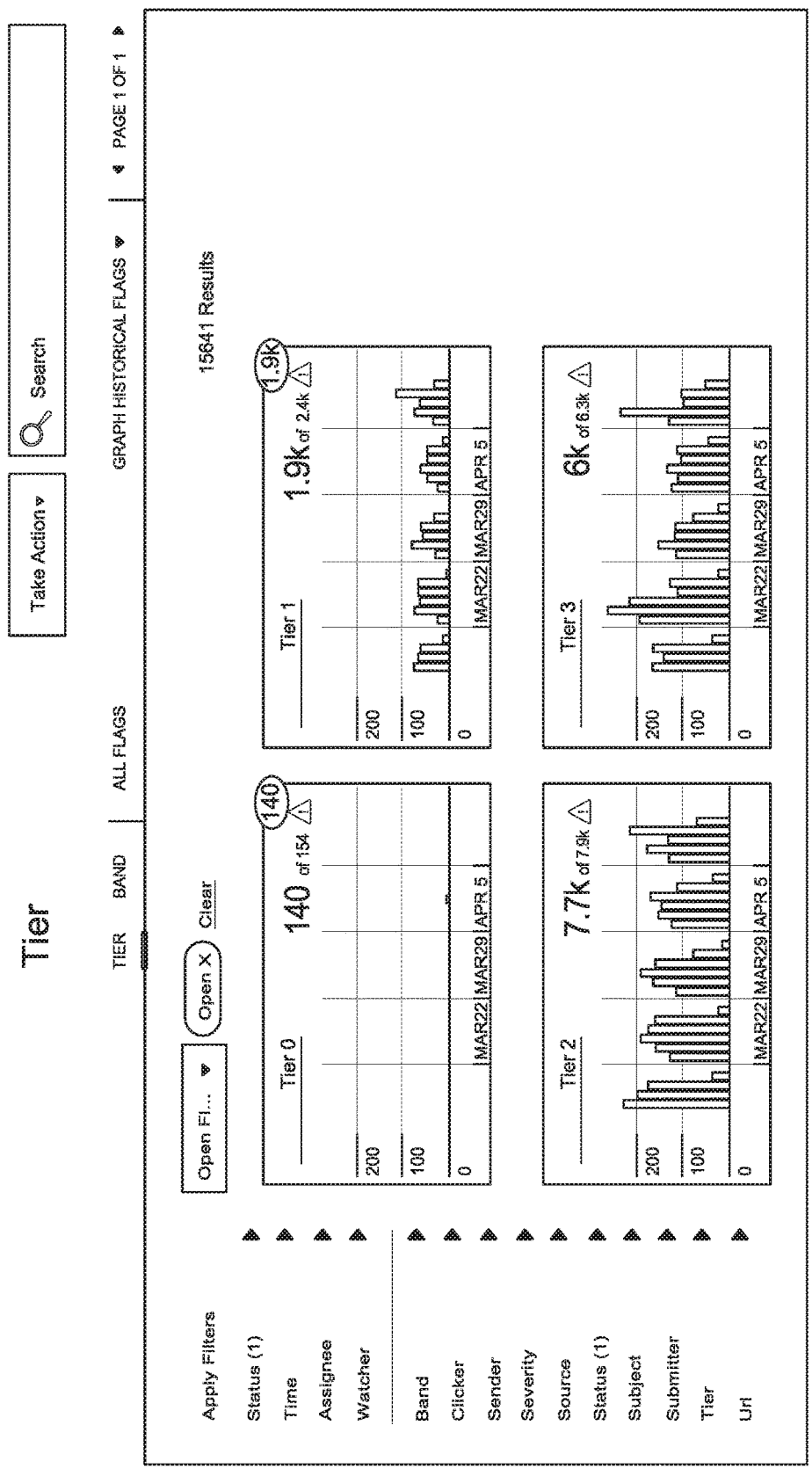
FIG. 7 is a data cluster analysis user interface in which multiple data clusters are prioritized, as used in an embodiment.

FIG. 7 shows a data cluster analysis user interface in which multiple data clusters are prioritized. The interactive user interface (generated with user interface module 219 of FIG. 2) can include an element selectable by a user. This example includes four selectable elements, labeled tier 0, tier 1, tier 2, and tier 3. Here, the selectable elements relate to classifications reflecting the priority for assessing whether the prescreened electronic communications associated with data clusters are undesirable electronic communications.

Figure 8:
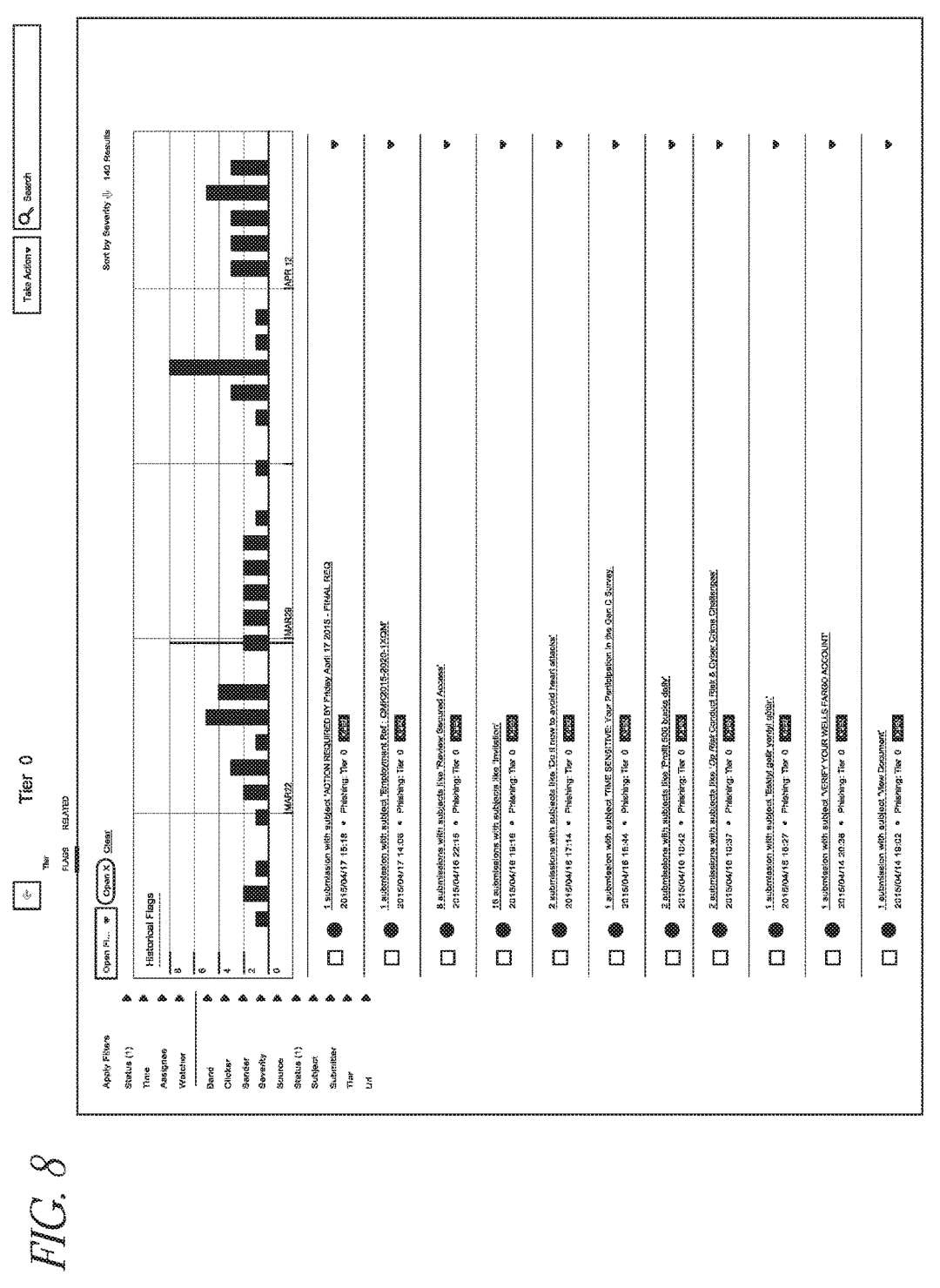

A user selects a selectable element with a suitable input device such as a mouse, finger, or stylus. FIG. 8 shows a data cluster analysis user interface showing potentially undesirable electronic communications for a high priority group of data clusters. Turning next to FIG. 8, the user has selected tier 0. The interactive user interface shown in FIG. 8 has been updated to show a list of data clusters associated with that tier. For example, the first item in the list shows a data cluster comprising one prescreened electronic communication with the subject field "ACTION REQUIRED BY Friday Apr. 17, 2015—FINAL REQUEST." The second item in the list shows a data cluster comprising one prescreened electronic communication with the subject field "Employment Ref: QMK2015-2020-1XQM." The third item in the list shows a data cluster comprising eight prescreened electronic communications with subject fields like "Review Secured Access."

FIG. 8 also demonstrates certain aspects of the system's front-end filtering capabilities. The left-most column of FIG. 8 shows example metadata fields or filters that are filterable for each cluster. For example, a user can filter clusters based of a specific sender, rather than conducting tiled-tier filtering. A search bar in the upper-right corner of FIG. 8 allows for similar metadata search.

A user selects the third item in the list (the third data cluster) with a suitable input device. FIGS. 9-13 shows various aspects of a dossier analysis user interface showing informational data regarding a data cluster, here, the third data cluster. The interactive user interface shown in FIG. 9 has been updated to show informational data associated with the third data cluster. In this example, the interactive user interface displays a summary tab showing information such as who sent the prescreened electronic communications in the data cluster to the local network, who in the local network submitted it, which URLs were found in the prescreened electronic communications, which attachments were found in the prescreened electronic communications, and/or whether any of the URLs were found in a DNSBL and/or RBL or other blacklist. Here, the summary tab shows the prescreened electronic communications in the data cluster contain 61 total URLs and one attachment. Two of the URLs were found in a DNSBL and/or RBL or other blacklist, here the RISKIQ blacklist (RiskIQ, Inc., San Francisco, Calif.).

The user can select a messages tab with a suitable input device to have additional information data displayed on the user interface. The interactive user interface shown in FIG. 10 has been updated to show additional informational data associated with the third data cluster. In this example, the messages tab shows textual data, such as the message body, of prescreened electronic communications in the data cluster.

The user can select a clickers tab with a suitable input device to have additional information data displayed on the user interface. The interactive user interface shown in FIG. 11 has been updated to show additional informational data associated with the third data cluster. In this example, the clickers tab shows the result of searching the proxy log for the URLs associated with the data cluster to see who in the local network clicked on the links. The NAME field reflects the name of the user who accessed the URL. The NBID field reflects an identification number associated with the user. The BAND field reflects the user's rank or status within the local network, with a lower BAND number reflecting a higher ranking user. The NAME, NBID, and BAND can be stored in and retrieved from the data cluster dossier, as discussed.

The user can also select a recipients tab with a suitable input device to have additional information data displayed on the user interface. The interactive user interface shown in FIG. 12 has been updated to show additional informational data associated with the third data cluster. In this example, the recipients tab shows the result of searching electronic communications storage device 203 (such as a PROOFPOINT log) to identify recipients in the local network received electronic communications similar to the prescreened electronic communications, in addition to those recipients who reported the prescreened electronic communications to an administrator.

The user can also select a raw data option with a suitable input device to have additional information data displayed on the user interface. The interactive user interface shown in FIG. 13 has been updated to show additional informational data associated with the third data cluster. In this example, the raw data shows PROOFPOINT logs.

Figure 14B:
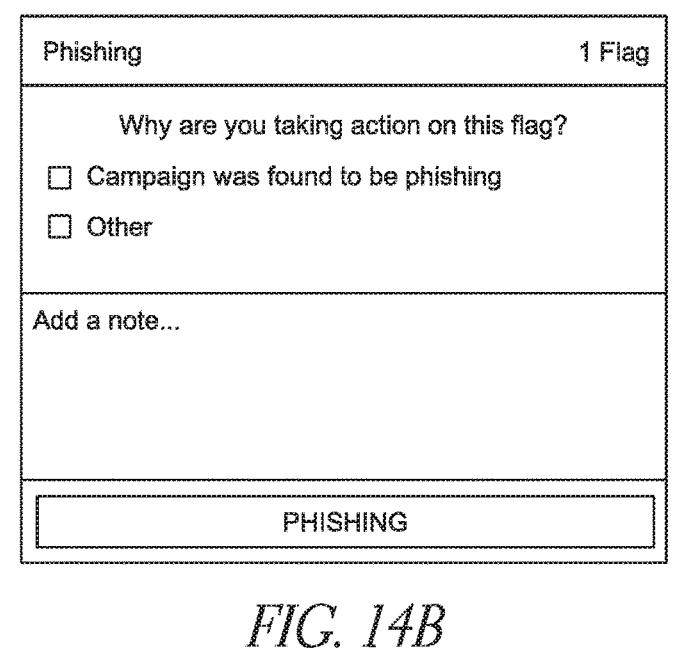

Turning next to FIGS. 14A and 14B, which show dossier analysis user interfaces showing informational data regarding a data cluster, once a data cluster is analyzed, an analyst gives the data cluster a status, such as "legitimate," "spam," "phishing," or "malicious." Depending on the status, recipients are notified, such as by email, informing the recipients not to enter their credentials or informing the recipients the prescreened electronic communications is legitimate and can be responded to. As noted above, in various embodiments, a recipient need not have reported a potentially undesirable electronic communication (e.g., to an abuse account) to receive the notification. It should also be understood that, in certain embodiments, a recipient can receive such a notification even if the potentially undesirable electronic communication received does not match all of the characteristics in the initial cluster in all respects. For example, a recipient may receive a notification if the recipient received an email from the same sender, with a slightly different subject but including the same phishing link, or variation on that phishing link and/or similar language.

All recipients associated with a data cluster can be identified (such as using PROOFPOINT logs) and stored in the data cluster dossier. The dossier can be cross-referenced for the notification. In yet another example, a seed email might lead to one hundred nearly identical emails being identified, but based on the characteristics of those emails, it may be discovered that there are other shared attributes among those that end up expanding the volume of potential spam that is captured. For example, email 1 is from sender A, with subject line B and link C. That link might show up in emails from a different sender D who does not use the same subject B. Nevertheless, the system would still recognize the emails are relevant because of the link. Then, the system can analyze emails with subject B and recognize that sender A is also using a third link and then cross reference and discover other senders using that different link.

III. Terminology

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments. In addition, the inventions illustratively disclosed herein suitably may be practiced in the absence of any element which is not specifically disclosed herein.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A system comprising:
   one or more computer readable storage mediums having program instructions embodied thereon; and
   one or more hardware processors configured to execute the program instructions to cause the system to:
      transmit data for displaying a dynamic user interface indicating a plurality of priority tiers of different priorities for assessing if emails are undesirable;
      in response to receiving a selection of a first priority tier of the plurality of priority tiers, update the dynamic user interface to indicate a plurality of clusters of emails associated with the first priority tier including at least a first cluster of emails, wherein a first plurality of emails are included in the first cluster of emails based at least in part on having a first feature in common;
      in response to receiving a selection of at least the first cluster of emails of the plurality of clusters of email, update the dynamic user interface to display:
         the first plurality of emails that are included in the first cluster of emails; and
         a second email included in the first cluster of emails, wherein the second email does not include the first feature that is common to the first plurality of emails, and wherein the second email shares a second feature in common with at least one email from the first plurality of emails;
      in response to receiving one or more user interactions with the dynamic user interface, update the dynamic user interface to display:
         a plurality of uniform resource locators (URLs), wherein each URL in the plurality of URLs is embedded in one or more of the emails of the first cluster of emails included in the first priority tier;
         information about a plurality of users, wherein each user of the plurality of users accessed one or more of the plurality of URLs embedded in one or more emails of the first cluster of emails included in the first priority tier;
      transmit data for displaying, in the dynamic user interface, a menu of labels selectable to associate a status or maliciousness with a cluster; and
      in response to receiving a selection of a first label from the menu of labels, associate the first label with the first cluster of emails including the first plurality of emails and the second email.

2. The system of claim 1, wherein the first cluster is categorized into the first priority tier based at least in part on at least one of: organizational roles of recipients of emails included in the first cluster, a number of emails included in the first cluster, an access to a first URL included in any email included in the first cluster, or a match of a second URL included in any email included in the first cluster with a blackhole listed URL.

3. The system of claim 1, the first feature common to the first plurality of emails comprising at least one of:
   a field corresponding to a purported author;
   one or more recipient fields corresponding to recipients;
   a subject field corresponding to a purported topic; and
   a URL.

4. The system of claim 1, one or more processors configured to execute the program instructions to cause the system to:
   transmit data for displaying a plurality of filters including at least two of: a sender, a severity, a source, a subject, and a URL;
   receive a selection of a selected filter from among plurality of filters; and
   update the dynamic user interface based at least in part on the selected filter.

5. A method for analyzing suspicious emails comprising:
   displaying, on a display device, a dynamic user interface indicating a plurality of priority tiers indicating different priorities for analyzing suspicious emails;
   receiving a selection of a first priority tier from among the plurality of priority tiers;
   in response to receiving the selection of the first priority tier, updating the dynamic user interface to indicate a plurality of clusters of emails associated with the first priority tier including at least a first cluster of emails, wherein a first plurality of emails are included in the first cluster based at least in part on having a first feature in common;
   receiving a selection of at least the first cluster of emails from among the plurality of clusters of emails;
   in response to receiving the selection of at least the first cluster of emails, causing the dynamic user interface to display:
      the first plurality of emails that are included in the first cluster of emails; and
      a second email included in the first cluster of emails, wherein the second email does not include the first feature that is common to the first plurality of emails, and wherein the second email shares a different feature in common with at least one email from the first plurality of emails;
   in response to receiving one or more user interactions with the dynamic user interface, updating the dynamic user interface to display:

a plurality of uniform resource locators (URLs), wherein each URL in the plurality of URLs is embedded in one or more of the emails of the first cluster of emails included in the first priority tier; and information about a plurality of users, wherein each user of the plurality of users accessed one or more of the URLs embedded in one or more emails of the first cluster of emails included in the first priority tier;

displaying, in the dynamic user interface, a menu including a plurality of labels selectable to associate a status or maliciousness with a cluster;

receiving a selection of a first label from the plurality of labels; and in response to receiving the selection of the first label, classifying the first cluster of emails including the first plurality of emails and the second email with the first label.

6. The method of claim 5, wherein the first cluster of emails is associated with the first priority tier based on at least in part on at least one of: an organizational roles of a recipient of an email included in the first cluster of emails, a number of emails included in the first cluster of emails, an access to a URL included in an email included in the first cluster of emails, or a match of a URL included in an email in the first cluster of emails with a blackhole listed URL.

7. The method of claim 5, the first feature common to a plurality of emails comprising at least one of:
a field corresponding to a purported author;
one or more recipient fields corresponding to recipients;
a subject field corresponding to a purported topic; and
a URL.

8. The method of claim 5, further comprising:
displaying a plurality of filters including at least two of: a sender, a severity, a source, a subject, and a URL;
receiving a selection of a selected filter from among plurality of filters; and
updating the dynamic user interface based at least in part on the selected filter.

9. A system comprising:
one or more computer readable storage mediums having program instructions embodied thereon; and
one or more hardware processors configured to execute the program instructions to cause the system to:
receive submissions of suspicious electronic communications;
categorize the suspicious electronic communications into clusters, wherein a first cluster of the clusters includes:
a first plurality of electronic communications categorized into the first cluster based at least in part on having a first feature in common; and
a second electronic communication that does not include the first feature and does share a second feature in common with at least one electronic communication of the first plurality of electronic communications;
categorize the clusters into priority tiers indicating different priorities for assessing if electronic communications are undesirable, wherein the first cluster is categorized into a first priority tier;
in response to receiving a selection of a first priority tier, provide first data including an indication of a first plurality of clusters associated with the first priority tier;
in response to receiving a selection of at least the first cluster, provide second data for displaying indications of the first plurality of electronic communications and the second electronic communication;
in response to receiving one or more user interactions to display details about the first cluster, provide third data for displaying:
a plurality of uniform resource locators (URLs), wherein each URL in the plurality of URLs is embedded in one or more of the electronic communications of the first cluster included in the first priority tier; and
information about a plurality of users, wherein each user of the plurality of users accessed one or more of the URLs embedded in one or more electronic communications of the first cluster included in the first priority tier;
receive a disposition indicating a type of undesirable electronic communication, the disposition selected from a menu of labels; and
apply the disposition to the first cluster including the first plurality of electronic communications and the second electronic communication.

10. The system of claim 9, wherein the first cluster is categorized into the first priority tier based at least in part on at least one of: organizational roles of recipients of electronic communications included in the first cluster, a number of electronic communications included in the first cluster, an access to a URL included in any electronic communication included in the first cluster, or a match of a URL included in any electronic communication included in the first cluster with a blackhole listed URL.

11. The system of claim 9, one or more processors configured to execute the program instructions to cause the system to:
filter the first data based on at least one of: a sender, a severity, a source, a subject, and a URL.

* * * * *